US009473627B2

(12) United States Patent
Thelin et al.

(10) Patent No.: US 9,473,627 B2
(45) Date of Patent: Oct. 18, 2016

(54) VIDEO ENDPOINTS AND RELATED METHODS FOR TRANSMITTING STORED TEXT TO OTHER VIDEO ENDPOINTS

(71) Applicant: Sorenson Communications, Inc., Salt Lake City, UT (US)

(72) Inventors: Brett Thelin, Salt Lake City, UT (US); Tara Lalor, Salt Lake City, UT (US); Jeremiah Long, Salt Lake City, UT (US); Cameron Dadgari, Salt Lake City, UT (US); Kevin Selman, Salt Lake City, UT (US); Lane Walters, Salt Lake City, UT (US); Kurt Eilander, Salt Lake City, UT (US); David Frye, Salt Lake City, UT (US)

(73) Assignee: SORENSON COMMUNICATIONS, INC., Salt Lake City, UT (US)

(*) Notice: Subject to any disclaimer, the term of this patent is extended or adjusted under 35 U.S.C. 154(b) by 0 days.

(21) Appl. No.: 14/543,706

(22) Filed: Nov. 17, 2014

(65) Prior Publication Data
US 2015/0130887 A1 May 14, 2015

Related U.S. Application Data

(63) Continuation-in-part of application No. 14/075,968, filed on Nov. 8, 2013, now Pat. No. 9,185,211.

(51) Int. Cl.
*H04N 7/14* (2006.01)
*H04M 3/42* (2006.01)
*H04L 12/18* (2006.01)

(52) U.S. Cl.
CPC ...... *H04M 3/42391* (2013.01); *H04L 12/1827* (2013.01); *H04M 3/42382* (2013.01); *H04M 2201/50* (2013.01); *H04N 7/141* (2013.01)

(58) Field of Classification Search
USPC ...................................... 348/14.01
See application file for complete search history.

(56) References Cited

U.S. PATENT DOCUMENTS

| 6,188,429 | B1* | 2/2001 | Martin et al. ............ 348/14.08 |
| 6,259,449 | B1* | 7/2001 | Saxena ............ G06F 3/0481 715/853 |
| 6,480,825 | B1 | 11/2002 | Sharma et al. |
| 6,487,209 | B1 | 11/2002 | Valentine et al. |
| 6,631,183 | B1 | 10/2003 | Rautila et al. |

(Continued)

FOREIGN PATENT DOCUMENTS

| EP | 0617534 | 9/1994 |
| WO | 2005031995 A1 | 4/2005 |

*Primary Examiner* — Maria El-Zoobi
(74) *Attorney, Agent, or Firm* — TraskBritt

(57) ABSTRACT

A video endpoint and related methods are disclosed. A video endpoint includes a control circuit configured to provide a user interface configured to enable a user to communicate with another user of another video endpoint with text during video communications with the other user. The user interface is also configured to enable the user to select from text strings stored in a database. A method of operating the video endpoint includes transmitting data corresponding to a selected one of the text strings stored in the database to the other video endpoint during the video communications responsive to the user selecting the selected one of the text strings. A method of transforming a computing device into a video endpoint includes storing computer-readable instructions directed to performing the functions of the control circuit on one or more servers, and transmitting the computer-readable instructions to the computing device.

18 Claims, 11 Drawing Sheets

(56) References Cited

U.S. PATENT DOCUMENTS

| | | |
|---|---|---|
| 6,791,976 B2 | 9/2004 | Huh et al. |
| 6,993,488 B2 | 1/2006 | Vainio et al. |
| 7,274,779 B2 | 9/2007 | Casey |
| 7,289,606 B2 | 10/2007 | Sibal et al. |
| 8,555,179 B2* | 10/2013 | Lee .................. H04N 7/147 348/14.03 |
| 8,676,236 B1 | 3/2014 | Gautam et al. |
| 2002/0149705 A1* | 10/2002 | Allen ............ H04N 7/17318 348/734 |
| 2003/0118171 A1 | 6/2003 | Mitsuo |
| 2004/0225713 A1* | 11/2004 | Abbasi et al. ............... 709/203 |
| 2005/0086699 A1* | 4/2005 | Hahn et al. ................. 725/106 |
| 2009/0086012 A1 | 4/2009 | Thapa |
| 2009/0187486 A1* | 7/2009 | Lefenfeld et al. ........... 705/14 |
| 2010/0220840 A1* | 9/2010 | Ray et al. ..................... 379/37 |
| 2011/0231194 A1* | 9/2011 | Lewis .......................... 704/276 |
| 2012/0034938 A1* | 2/2012 | Kreitzer ............. H04L 12/581 455/466 |
| 2014/0092112 A1* | 4/2014 | Solomon ............ G06F 1/3203 345/545 |
| 2014/0099909 A1* | 4/2014 | Daly et al. ................. 455/404.1 |
| 2014/0267579 A1* | 9/2014 | Montero .............. H04N 7/147 348/14.11 |

* cited by examiner

VIDEO ENDPOINTS AND RELATED METHODS FOR TRANSMITTING STORED TEXT TO OTHER VIDEO ENDPOINTS

CROSS-REFERENCE TO RELATED APPLICATION

This application is a continuation-in-part of U.S. patent application Ser. No. 14/075,968, entitled "APPARATUSES AND METHODS FOR OPERATING A COMMUNICATION SYSTEM IN ONE OF A TONE MODE AND A TEXT MODE," filed Nov. 8, 2013, pending, the disclosure of which is hereby incorporated in its entirety herein by this reference.

TECHNICAL FIELD

The present disclosure relates to conveying information from data signals from a communication device to a far end communication device according to a plurality of different modes. More specifically, the present disclosure relates to operational modes for conveying information from data signals during communication sessions involving audibly-impaired people.

BACKGROUND

Traditional communication systems, such as standard and cellular telephone systems, enable verbal communications between people at different locations and dual tone multiple frequency (DTMF) communications for transmitting information to machines via tones. Communication systems for audibly-impaired (i.e., hearing-impaired, speech-impaired, or a combination thereof) individuals may also enable non-verbal communications instead of, or in addition to, verbal communications. Some communication systems for audibly-impaired people enable communications between communication devices for audibly-impaired people and communication systems for audibly-capable users (e.g., standard telephones, cellular telephones, etc.). For example, a video relay service (VRS) may provide speech to sign language translation services, and sign language to speech translation services for a communication session between a video phone for an audibly-impaired user and a traditional telephone for an audibly-capable user.

Some communication systems for audibly-impaired people enable communications between communication devices for audibly-impaired people (e.g., video endpoint to video endpoint communications). These communication systems may operate with or without intervention from a video relay service, depending on the audible impairments/capabilities and non-audible capabilities (e.g., ability to understand and/or sign in a sign language) of the parties operating the communication devices for audibly-impaired people.

Conventionally, the audibly-impaired user communicates with a call assistant (e.g., communicating via sign language), and then the call assistant conveys the messages to the far-end user. The call assistant may act as a translator for both the audibly-impaired user (e.g., communicating via sign language) and the far-end user (communicating via speech communication). If the far-end user is not a live person (e.g., an automated phone menu system), the call assistant may interpret the automated menu options to the audibly-impaired user via sign language. The audibly-impaired user may respond by using sign language to instruct the call assistant which selection to choose. The call assistant then makes the appropriate selection. For example, the call assistant may speak the message from the audibly-impaired user if the automated phone menu system is configured to recognize and interpret voice. Alternatively, the far-end user (e.g., automated phone menu system) may be configured to recognize DTMF signals. Therefore, the call assistant may use a numeric keypad configured to send such DTMF signals to the automated phone system. The inventors have appreciated that, at times, the audibly-impaired person may desire to convey information through the communication device to the far-end user through methods other than by sign language communication, which functionality is not offered by conventional VRS systems.

BRIEF SUMMARY

In some embodiments, the present disclosure comprises a video endpoint including video equipment configured to enable an audibly-impaired user to engage in video communications with another user of another video endpoint. The video endpoint also includes at least one control circuit configured to provide a user interface to the audibly-impaired user. The user interface is configured to enable the audibly-impaired user to communicate with the other user with text during the video communications with the other user. The user interface is also configured to enable the audibly-impaired user to select from text strings stored in a database. The at least one control circuit is also configured to transmit a selected one of the text strings to the other video endpoint for presentation to the other user.

In some embodiments, the present disclosure comprises a method of operating a video endpoint for audibly-impaired users. The method includes engaging in video communications with another video endpoint, and enabling an audibly-impaired user of the video endpoint to select from text strings stored in a database. The method also includes transmitting data corresponding to a selected one of the text strings stored in the database to the other video endpoint during the video communications for display by the other video endpoint responsive to the audibly-impaired user selecting the selected one of the text strings.

In some embodiments, the present disclosure comprises a method of transforming a computing device into a video endpoint. The method includes storing computer-readable instructions on one or more storage devices of one or more servers configured to communicate with the computing device. The computer-readable instructions are directed to instructing the computing device to provide a user interface to an audibly-impaired user. The user interface is configured to enable the audibly-impaired user to communicate with another user of another video endpoint with text during video communications with the other user, and enable the audibly-impaired user to select from text strings stored in a database. The computer readable instructions are also directed to instructing the computing device to transmit a selected one of the text strings to the other video endpoint for presentation to the other user during the video communications. The method also includes transmitting the computer-readable instructions to the computing device.

DETAILED DESCRIPTION

Figure 1:
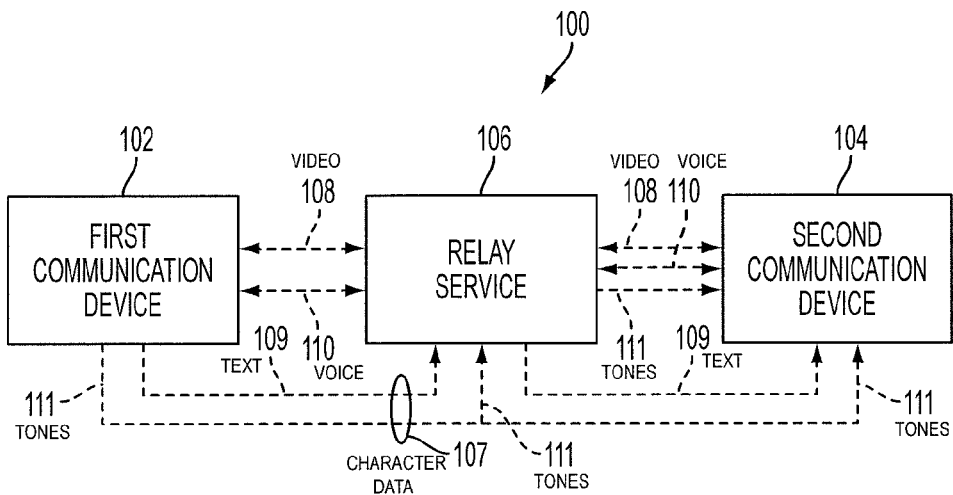
FIG. 1 is a simplified block diagram of a communication system according to an embodiment of the present disclosure.

In the following detailed description, reference is made to the accompanying drawings which form a part hereof, and in which is shown by way of illustration specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions rearrangements, or combinations thereof within the scope of the present disclosure may be made and will become apparent to those of ordinary skill in the art.

In accordance with common practice the various features illustrated in the drawings may not be drawn to scale. The illustrations presented herein are not meant to be actual views of any particular apparatus (e.g., device, system, etc.) or method, but are merely idealized representations that are employed to describe various embodiments of the present disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A general-purpose processor may be a microprocessor, but in the alternative, the general-purpose processor may be any processor, controller, microcontroller, or state machine suitable for carrying out processes of the present disclosure. A processor may also be implemented as a combination of computing devices, such as a combination of a DSP and a microprocessor, a plurality of microprocessors, one or more microprocessors in conjunction with a DSP core, or any other such configuration.

A general-purpose processor may be part of a general-purpose computer, which should be considered a special purpose computer when configured to execute instructions (e.g., software code) for carrying out embodiments of the present disclosure. Moreover, when configured according to embodiments of the present disclosure, such a special-purpose computer improves the function of a general-purpose computer because, absent the present disclosure, the general-purpose computer would not be able to carry out the processes of the present disclosure. The present disclosure also provides meaningful limitations in one or more particular technical environments that go beyond an abstract idea. For example, embodiments of the present disclosure provide improvements in the technical field of communications involving audibly-impaired people.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 3 will be mostly in the numerical format 3xx.

Embodiments of the present disclosure include apparatuses and methods for operating a communication system. It should be noted that while the utility and application of the various embodiments of the present disclosure are described herein with reference to communication systems for individuals having disabilities, the embodiments of the present disclosure also include any environment for a communication system to selectively operate in one of a plurality of different modes, such as where a text mode and a tone mode may be desirable.

FIG. 1 is a simplified block diagram of a communication system 100 according to an embodiment of the present disclosure. The communication system 100 may include a video relay service (VRS) or other communication system configured to facilitate communication between users having a disability and far-end users (e.g., audibly-capable users, computerized systems, etc.).

The communication system 100 may include a first communication device 102 and a second communication device 104 that are configured to participate in communication sessions through one or more networks. The communication system 100 may also include a relay service 106 configured to communicate with the first communication device 102 and the second communication device 104. The first communication device 102 may include any device configured to participate in a communication session with the second communication device 104, the relay service 106, or a combination thereof.

In some embodiments, the first communication device 102 may comprise a communication device for an individual having a disability, such as a person having a hearing impairment, speech impairment, and/or vision impairment. Communication devices that may be used to assist users having such disabilities may include a video phone device, a text-captioned device, a braille display device, keyboards, other devices or accessibility interfaces, and combinations thereof. The first communication device 102 may include a computing device configured to execute software directed to perform such communication capabilities. Examples of suitable computing devices may include a desktop computer, a laptop computer, a tablet computer, a personal digital assistant (PDA), a smartphone, and other computing devices.

In a typical relay system for users having disabilities, the first communication device 102 may be operated by a user having a disability and the second communication device 104 may be operated by an audibly-capable user. For convenience, the first communication device 102 may also be referred to as the "near-end" device, while the second communication device 104 may also be referred to herein as the "far-end" device. The user of the first communication device 102 may be referred to as the "near-end user," and the user of the second communication device 104 may be referred to as the "far-end user." Of course, it is recognized that "near-end" and "far-end" are relative terms depending on the perspective of the particular user. Thus, the terms "near-end" and "far-end" are used as a convenient way of distinguishing between users.

The near-end user may have a disability that may make it difficult to communicate with the far-end user. The near-end user may be an audibly-impaired (e.g., deaf) user, a speech-impaired (e.g., mute) user, a visually-impaired (e.g., blind) user, or have some other impairment or combinations thereof. The far-end user may be an audibly-capable user, a computer system (e.g., an automated system), an individual having a disability, or a combination thereof.

The relay service 106 is configured to interpret communication between the first communication device 102 and the second communication device 104. The operator at the relay service 106 performing the interpretation may be referred to as a "call assistant." Communication between the first communication device 102 and the relay service 106 may be typically performed through video or text communication between the near-end user and the call assistant, while communication between the relay service 106 and the second communication device 104 may be typically performed using voice communication between the call assistant and the far-end user.

For near-end users that have vision capabilities, video data 108 may be transmitted between the first communication device 102 and the relay service 106 to facilitate visual communication between the near-end user and the call assistant. Thus, the video data 108 may include video information conveying video images of the near-end user and the call assistant. For example, the video data 108 may include video images of the near-end user and the call assistant. As a result, the near-end user and the call assistant may communicate with each other using sign language, facial expressions, lip reading, and/or other body language between the near-end user and the call assistant.

In some embodiments, voice data 110 may be transmitted between the first communication device 102 and the relay service 106. For example, if the near-end user has at least some speech capabilities (e.g., users that are hearing-impaired but have some ability to speak), voice data 110 may be transmitted from the first communication device 102 to the relay service 106. If the near-end user has at least some hearing-capabilities (e.g., users that are not completely deaf), voice data 110 may be transmitted from the relay service 106 to the first communication device 102. In some embodiments, however, audio from the first communication device 102 may be disabled such that the relay service 106 and/or the second communication device 104 may not be able to hear any speech or other audible noise from the first communication device 102.

In some embodiments, the first communication device 102 may include a braille display for visually-impaired users to communicate with the relay service 106. Such a braille display may include the visually-impaired user to speak and/or type information that is sent to relay service 106 for translation to the far-end user, and receive information from the relay service 106 that is converted to braille on the first communication device 102 for the near-end user to understand.

The relay service 106 and the second communication device 104 may be configured to communicate voice data 110 with each other to facilitate audible communication between the call assistant and the far-end user (e.g., a live person, a computer system, etc.). The voice data 110 may include audible information shared between the relay service 106 and the second communication device 104. For example, the voice data 110 may include audible speech of the call assistant and the far-end user. As a result, the communication system 100 may facilitate translated communication for near-end users with others regardless of whether the far-end user is able to communicate using the mode of communication for the near-end user. In some embodiments, the voice data 110 transmitted to the second communication device 104 may also include audible speech of the near-end user if the first communication device 102 is configured to transmit audio, and such audio is desired to be heard by the far-end user. Voice data 110 generated by the far-end user is not limited to live voice from a live person. For example, the far-end user may include an automated telephone menu system that transmits voice data 110 that includes synthesized voice, recorded voice, or other audible information intended to convey information (e.g., interactive voice response (IVR)).

In some embodiments, the second communication device 104 may be configured to also send and receive video communications. For example, both the first communication device 102 and the second communication device 104 may be video phones of a VRS communication system. In such embodiments, the second communication device 104 may be configured to receive the video data 108 including the video images of the near-end user, the call assistant, or a combination thereof. The second communication device 104 may be configured to receive the video data 108 from the first communication device 102, the relay service 106, or combinations thereof. Receipt of the video data 108 by the second communication device 104 may enable the far-end user to observe non-verbal communication from the near-end user. Thus, the communication system 100 may also be configured to facilitate communication between near-end users.

At times, it may be desirable for the far-end user, the call assistant, or combinations thereof, to receive additional communication may be desirable for the near-end user to transmit as character data 107 that is not voice data 110 or video data 108. By way of non-limiting example, where the far-end user includes IVR technology, it may be desirable for the far-end user to receive tones 111 (e.g., DTMF tones). In such situations, the call assistant may translate (e.g., via sign language, text captioning, etc.) menu options from the far-end user for the near-end user. As discussed above, conventional communication systems may require the near-end user to respond by using sign language via the video data 108, whereupon the call assistant may use a numeric keypad at the relay service 106 to send tones 111 to the second communication device 104. Such a system may result in errors, inefficiency, and/or an undesirable user experience because of multiple steps in the translation. Also by way of non-limiting example, the far-end user may be a live person that requests character-intensive information, such as lengthy numbers (e.g., phone numbers, social security numbers, etc.), passwords, or codes. Conventional communication systems may require the near-end user to respond by using sign language via the video data 108, whereupon the call assistant may translate the sign language to speech for the far-end user via the voice data 110. Such a system may also result in errors, inefficiency, and/or an undesirable user experience.

Embodiments of the present disclosure enable the near-end user at the first communication device 102 to convey character data 107 to the relay service 106 and/or the second communication device 104. Such character data 107 may be different than the video data 108 and the voice data 110 transmitted by the communication system 100. As an example, the first communication device 102 may include an input device (not shown in FIG. 1) configured to generate the character data 107 responsive to a user input. The input device may include a numeric keypad, a keyboard, a touch-screen, a remote control, a mouse, other input device, or combinations thereof. The character data 107 may be transmitted as tones 111, text signals 109, or other formats for conveying character-based information.

Depending on the capabilities of the far-end user, it may be desirable for the far-end user to receive certain types of character-based information, but not others. The communication system 100 may be configured to selectively operate in one of a plurality of different modes that may determine how the character data 107 is conveyed to the relay service 106 and/or the second communication device 104. For example, the communication system 100 may be configured to selectively operate in at least one of a tone mode and a text mode. In some embodiments, the tone mode may comprise a DTMF mode, and the text mode may comprise an RTT mode. For convenience, the tone mode and the text mode may be referred to herein as the DTMF mode and the RTT mode, respectively.

The term "tone mode," as used herein, refers to a functional mode in which at least one audible tone (e.g., tone 111) is received by the second communication device 104 responsive to the user input from the first communication device 102 regardless of the format of the character data 107 generated by the first communication device 102. The audible tone 111 corresponds to the information input by the near-end user while conveying the character data 107.

For example, the first communication device 102 may include an input device having a numeric keypad with keys corresponding to the numbers 0 through 9, "*" and "#." If the near-end user selects (e.g., presses) one of the keys, the first communication device 102 may generate the character data 107 corresponding to the key selected by the near-end user. The character data 107 generated by the first communication device 102 may be formatted as a tone 111 or a text signal 109. In tone mode, however, the character data 107 that is received by the second communication device 104 may be formatted as a tone 111 regardless of how the character data 107 was first generated.

In some embodiments, the character data 107 may initially be generated by the first communication device 102 as a tone 111. In such an embodiment, the tone 111 may be transmitted from the first communication device 102 to the second communication device 104 directly, if such a direct connection exists. In some embodiments, the tone 111 may be transmitted from the first communication device 102 to the relay service 106, which may be configured to route the tone 111 to the second communication device 104.

In some embodiments, the character data 107 may initially be generated by the first communication device 102 as a text signal 109. In such an embodiment, the text signal 109 may be transmitted from the first communication device 102 to the second communication device 104. The relay service 106 may receive the text signal 109 and generate the appropriate tone 111 corresponding to the information being conveyed. The relay service 106 may then transmit the tone 111 to the second communication device 104. As a result, during tone mode the relay service 106 may transmit the tone 111 to the second communication device 104 regardless of the format that the character data 107 was received by the relay service 106.

By way of non-limiting example, the tone 111 may include two different frequencies depending on the input key selected by the near-end user, as illustrated in Table 1.

TABLE 1

|  | 1209 Hz. | 1336 Hz. | 1477 Hz. |
| --- | --- | --- | --- |
| 697 Hz. | 1 | 2 | 3 |
| 770 Hz. | 4 | 5 | 6 |
| 852 Hz. | 7 | 8 | 9 |
| 941 Hz. | * | 0 | # |

For example, if the "5" key is selected by the near-end user, the appropriate tone 111 may be generated by adding two sinusoidal signals, one with a frequency of 1336 Hz., and the other with a frequency of 770 Hz. The tones 111 may be received by the second communication device 104, and analysis of the received tones may reveal that the "5" key was selected.

As briefly mentioned above, the communication system 100 may also be configured to operate in a text mode. The term "text mode," as used herein, refers to a functional mode in which at least one text signal (e.g., text signal 109) is displayed to the call assistant and/or the far-end user regardless of the format of the character data 107 generated by the first communication device 102. If the text is displayed to the call assistant, the call assistant may then speak the message from the text to the far-end user at the second communication device 104.

For example, the near-end user may select a user input at the first communication device 102 to convey a message to the far-end user using character data 107. The character data 107 may be transmitted as a text signal 109, a tone 111, or some other format. In text mode, character data 107 may be displayed as text on an electronic display within view of the call assistant regardless of the format that the character data 107 was generated by the first communication device 102. For example, in some embodiments the character data 107 may be received by the relay service 106 as a text signal 109, whereupon the character data 107 may be displayed as text on the call assistant's electronic display with little, to no, additional conversion of the textual data. In some embodiments, however, the character data 107 may be received by the relay service 106 as a tone 111 that the relay service 106 converts to the corresponding text displayed on the call assistant's electronic display. The call assistant may then read the text and speak with the far-end user via the voice data 110. Thus, the text mode may include audio being transmitted to the second communication device 104 to convey the message from the character data 107.

For example, the far-end user may request information from the near-end user (via the relay service 106) that may be desirable to transmit through character data 107 generated by user inputs to an input device rather than sign language. Examples of such data may include numerical information such as a social security number, an account number, a phone number, etc. The call assistant may listen to the request from the far-end user via voice data 110 between the second communication device 104 and the relay service 106, and communicate the request using sign language to the near-end user via video data 108 between the relay service 106 and the first communication device 102. The near-end user may respond to the request by entering the appropriate character information into the input device. The call assistant may receive the character data 107 on the electronic display at the relay service 106 via text signal 109, and speak the character data 107 to the far-end user via voice data 110. In some embodiments, the second communication device 104 may be configured to accept a text signal 109. In such an embodiment, the second communication device 104 may be configured to receive the text signal 109 in addition to, or in the alternative of, the call assistant speaking the character information to the far-end user during text mode.

Thus, the communication system 100 may be configured to switch between modes that convey a message from character data 107 (e.g., digit commands from the near-end user) either as tones, audio, or text depending on the capabilities of the far-end user. It may be desirable to operate the relay service 106 in the text mode while a far-end user is a live person, as opposed to in the tone mode. For example, the audible tones associated with the tone mode may be distracting or unpleasant to a live person. It is also unlikely for a live person to be able to interpret a useful meaning from the audible tones of tone mode signals. Therefore, during text mode, even if the character data 107 is received by the relay service 106 as a tone 111, the information may be conveyed to the far-end user without the relay service 106 passing on the audible tones 111 to the second communication device 104. Rather, the information may be displayed as text on the electronic display of the relay service 106, and the call assistant may speak the message as audio that is transmitted to the second communication device with the voice data 110. In some embodiments, the second communication device 104 may be configured to receive text data 109 such that relay service 106 may convey the message as text data 109 to the second communication device 104.

It may be desirable to operate the relay service 106 in the tone mode if the far-end user is configured to accept DTMF signals. In general, accepting DTMF signals means that the far-end user is not a live person. For example, the second communication device 104 may be configured to transmit one of recorded speech signals and synthesized speech signals (e.g., voice data 110) to the relay service 106, the first communication device 102, or combinations thereof during a communication session. Recorded speech and synthesized speech messages often request interaction through the selection of keys that result in audible tones 111 being sent to the second communication device 104. By way of non-limiting example, automatic answering services, over the telephone automatic bill payment, banking, surveys, and other services often request a user to make selections that generate audible tones 111. As a result, the communication system 100 may be configured to operate in the tone mode responsive to a determination that a live person is not operating the second communication device 104.

The communication system 100 may be configured to operate in the text mode responsive to a determination that a live person is operating the second communication device 104. The determination of whether a far-end user is a live person participating in the communication session may be made manually, automatically, or a combination thereof.

A manual determination may be made by the call assistant distinguishing live speech from recorded speech and/or synthesized speech. The call assistant may be prompted to provide a result of the determination. For example, the call assistant may make a selection on an input device at the relay service 106 to indicate which mode is desired.

An automatic determination may be made by analyzing speech signals from the second communication device 104. The automatic determination may be made by the relay service 106, the first communication device 102, or combinations thereof. For example, the voice data 110 received from the second communication device 104 may be analyzed to determine if a recording, synthesized speech, or a live person is the source of the voice data 110. Different characteristics of the voice data 110 may be analyzed, such as audio quality, cadence, or other factors. For example, a system and method for detecting recorded speech is described in U.S. Pat. No. 6,480,825 to Sharma et al., and entitled "System and Method for Detecting a Recorded Voice," the disclosure of which is hereby incorporated herein in its entirety by this reference. As an example, Sharma et al. disclose training a pattern classifier, such as a Neural Tree Network, to distinguish between live and recorded speech. In addition, an apparatus and method for detecting errors in synthesized speech is described in U.S. Pat. No. 6,993,488 to Vainio et al., and entitled "Audible Error Detector and Controller Utilizing Channel Quality Data and Iterative Synthesis," the disclosure of which is hereby incorporated herein in its entirety by this reference. In particular, Vainio et al. disclose that characteristics atypical of human speech may be detected in synthesized speech.

In some embodiments, both a manual determination and an automatic determination of whether a live person is operating the second communication device 104 may be made. For example, an automatic determination may be made, and the call assistant may be prompted to confirm the determination. Also by way of example, an automatic determination may be attempted, and the call assistant may be prompted to make a manual determination if the automatic determination fails to make an adequate determination. In addition, an automatic determination may be made, but the call assistant may be able to manually override the automatic determination and provide a manual determination.

In addition, the communication system 100 may change modes during the same communication session as conditions may change. For example, a communication session may initially be answered by an automated menu system that eventually leads to a live operator as the far-end user. Some communication sessions may include a live operator transferring the call to a computerized system. At such transitions, a new mode may be detected by the communication system 100 to change the operating mode thereof.

In some embodiments, the relay service 106 may be configured to cause the communication system 100 to operate in the appropriate one of the tone mode and the text mode. In these embodiments, the phrases "operating the communication system 100 in the tone mode" and "operating the communication system 100 in the text mode" refer to the relay service 106 causing the communication system 100 to operate in the tone mode, and the text mode, respectively. In some embodiments, this mode selection involves the relay service 106 receiving the character data 107 from the first communication device 102 in a first format, and converting the character data 107 to a second format, as needed for the current mode. In some embodiments, however, the relay service 106 may inform the first communication device 102 of the desired mode. The first communication device 102 may then generate the character data 107 in the desired format for the current mode so that conversion by the relay service 106 may not be necessary. In either embodiment, the near-end user may not need to be aware of the mode or require using a different user interface depending on the mode.

In some embodiments, the first communication device 102 may be configured to cause the communication system 100 to operate in the appropriate one of the tone mode and the text mode. In these embodiments, the phrases "operating the communication system 100 in the tone mode" and "operating the communication system 100 in the text mode" refer to the first communication device 102 causing the communication system 100 to operate in the tone mode, and the text mode, respectively. In some embodiments, that may involve the first communication device 102 determining which operating mode should be employed by determining whether the far-end user is not a live person. Such a determination being made by the first communication device 102 may be an automatic determination by analyzing the voice data 110 generated by the second communication device 104 if such voice data 110 is received by the first communication device 102. In other words, some embodiments may include the analysis of the far-end voice data 110 being executed by the first communication device 102. As the near-end user may have significantly diminished hearing capabilities, a manual determination by the first communication device 102 may not be desirable.

Regardless of which one of the relay service 106 and the first communication device 102 is configured to cause the communication system 100 to operate in the appropriate one of the tone mode and the text mode, the end result is similar. For example, in either situation, the tone 111 may be received by the second communication device 104 during tone mode regardless of how the first communication device 102 generated the character data 107. Similarly, in either situation, an indicator of the text signal 109 may be displayed by the relay service 106 and/or the second communication device 104 during text mode.

The first communication device 102, the second communication device 104, and the relay service 106 may be configured to transmit the data signals 108, 109, 110, 111 over one or more networks. It should be recognized that even though the data signals 108, 109, 110, 111 are illustrated in the figures as individual lines, that does not mean that the data signals 108, 109, 110, 111 are transmitted separately. For example, some of the data signals 108, 109, 110, 111 may be transmitted together.

The networks used for conveying the data signals 108, 109, 110, 111 may include an internet protocol (IP) network. The networks may also include other networks, such as, for example, public switched telephone networks (PSTNs). The networks may include a wide area network (WAN), a local area network (LAN), a personal area network (PAN), and combinations thereof. In some embodiments, the networks may include a cloud network. The networks may be configured to facilitate wireless communications, communications through cables, and combinations thereof. Some non-limiting examples of suitable wireless communications may include "WiFi," Bluetooth, and mobile wireless networks. Some non-limiting examples of suitable cables include fiber-optic cables, coaxial cables, traditional telephone cables, and Ethernet cables.

Figure 2:
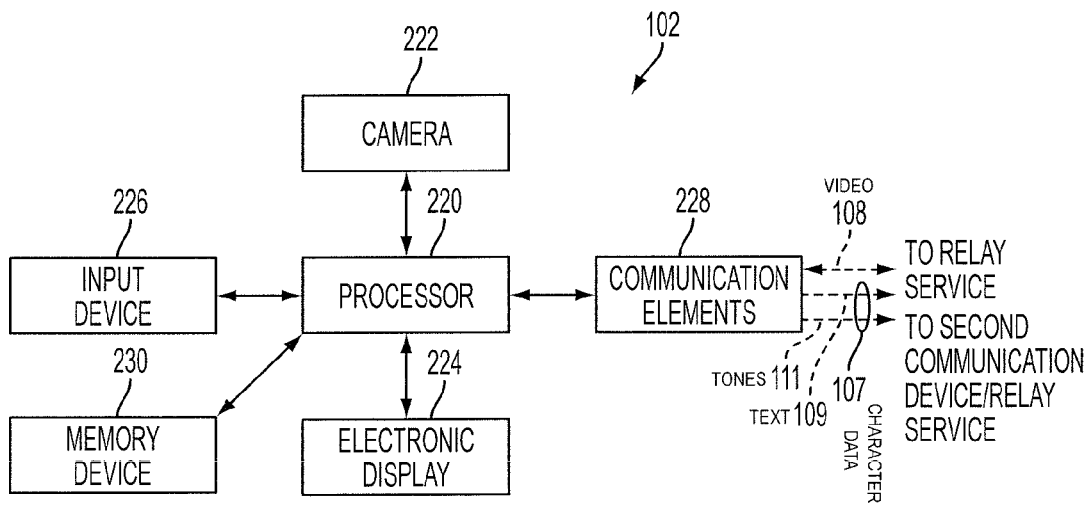
FIG. 2 is a simplified block diagram of the first communication device of FIG. 1.

FIG. 2 is a simplified block diagram of the first communication device 102 of FIG. 1. The first communication device 102 may include a processor 220 operably coupled with a camera 222, an electronic display 224, one or more communication elements 228, and a memory device 230. The first communication device 102 may be configured to communicate video data 108 from the camera 222 to the relay service 106 (FIG. 1) through the communication elements 228. The video data 108 captured by the camera 222 may include sign language communication originated by the near-end user. The first communication device 102 may also be configured to receive video data 108 from the relay service 106 through the communication elements 228 to be displayed by the electronic display 224. The video data 108 received by the first communication device 102 may include sign language communication originated by the call assistant at the relay service 106. The processor 220 may coordinate the communication between the various devices as well as execute instructions stored in computer-readable media of the memory device 230. The memory device 230 may include volatile and non-volatile memory storage for the first communication device 102.

In some embodiments, the first communication device 102 may be configured to cause the communication system 100 to operate in a plurality of different modes of operation. In some embodiments, the processor 220 and the memory device 230 may form a control circuit that is configured to determine which mode of operation the communication system 100 should operate in. As discussed in detail above, the first communication device 102 may be configured to cause the communication system 100 to operate in a text mode responsive to a determination that the far-end user is a live person operating the second communication device 104 that is participating in a communication session with the first communication device 102. The first communication device 102 may also be configured to cause the communication system 100 to operate in the tone mode responsive to a determination that the far-end user is not a live person operating the second communication device 104. Rather, the far-end user may be an automated computer system that employs synthesized voice and/or recorded voice.

In some embodiments, the first communication device 102 may be configured to automatically determine whether a live person is operating the second communication device 104. For example, the processor 220 may be configured to analyze a speech signal from the second communication device 104 to automatically make the determination. The communication elements 228 may be configured to deliver the speech signal as the voice data 110 from the second communication device 104 to the processor 220.

In operation, an input device 226 may receive an input from the near-end user. For example, the input device 226 may include a numeric keypad, a keyboard, a touchscreen, a remote control, a mouse, other input devices, or combinations thereof. For example, during a communication session, the near-end user may desire to enter character data 107 to transmit to the relay service 106, the second communication device 104, or a combination thereof.

For example, the far-end user may include an automated phone menu system that is requesting information from the user. Thus, the communication system 100 may operate in the tone mode. Rather than using sign language to convey this information to the call assistant, the near-end user may enter the information into the input device 226 to generate the character data 107 corresponding to the information entered into the input device 226. The character data 107 may be represented by the text signal 109, the tones 111, or both. The text signal 109 may include textual data, or other data corresponding to the information input by the near-end user. In some embodiments, the text signal 109 is sent to the relay service 106, which may generate the tone 111 that is transmitted to the second communication device 104. Thus, the information entered into the input device 226 may be conveyed to the second communication device 104 directly without the call assistant needing to translate such information from interpreting sign language and then entering the information for the near-end user. As a result, accuracy, efficiency, and/or user experience may be improved with regard to conveying this information to the far-end user. In some embodiments, embodiments, the character data 107 generated by the first communication device 102 as a tone 111 may be sent directly, or routed through the relay service 106, to the second communication device 104.

In some embodiments, the near-end user may desire to transmit character data 107 to the relay service 106 even if the far-end user is a live person and/or does not accept tones 111. Thus, the communication system 100 may operate in the text mode. For example, the far-end user may request information that the near-end user would prefer to enter through an input device 226 rather than using sign language to communicate with the call assistant. The character data 107 may be transmitted to the relay service 106, which may display the character data 107 as text to the call assistant regardless of the format of the character data 107. In the text mode, if the text is displayed to the call assistant, the call assistant may speak the message to the far-end user at the second communication device 104.

In some embodiments, the relay service 106 may be configured to distinguish whether the second communication device 104 may be configured to receive the text signal 109 or whether voice data 110 would be more desirable for conveying the information associated with the text signal 109 as will be discussed more fully with respect to FIG. 3. As for the near-end user at the first communication device 102, knowing the actual way the relay service 106 conveys the information to the second communication device 104 may not be necessary.

In addition, as the determination of the appropriate operational mode is made automatically by the relay service 106, or manually by the call assistant, the near-end user need not know what operational mode the communication system 100 is operating in. In fact, the near-end user need not even know of the existence of the different operating modes of the communication system 100. Thus, embodiments of the present disclosure provide for simplified and effective operation of the first communication device 102 from the perspective of the near-end user.

Figure 3:
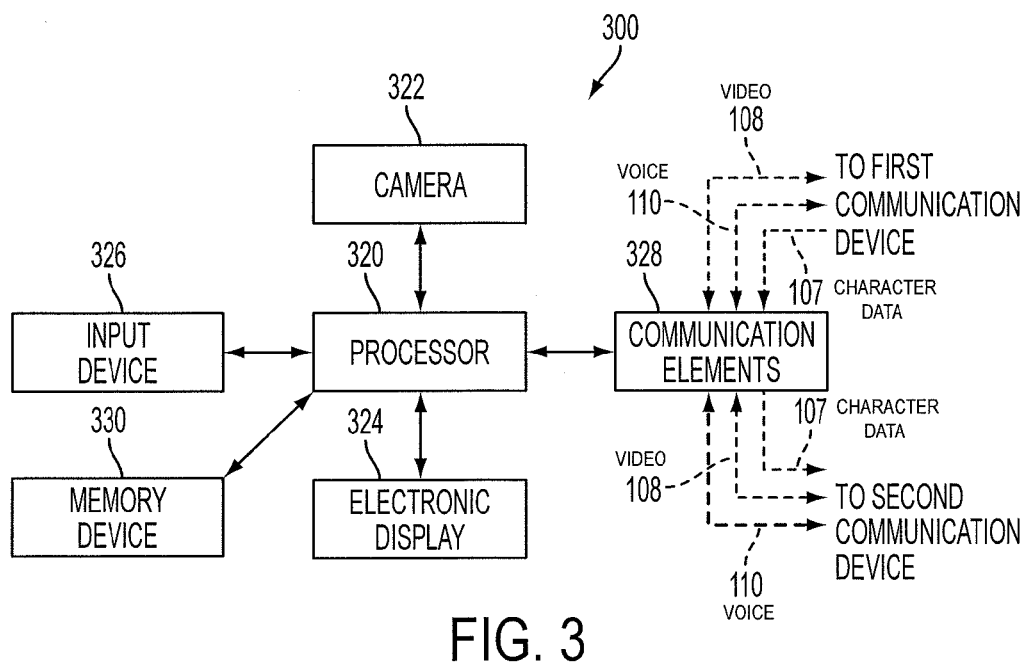
FIG. 3 is a simplified block diagram of a computing device for the call assistant of the relay service of FIG. 1.

FIG. 3 is a simplified block diagram of a computing device 300 for the call assistant of the relay service 106 of FIG. 1. The computing device 300 may include a processor 320 operably coupled with a camera 322, an electronic display 324, one or more communication elements 328, and a memory device 330. The computing device 300 may be configured to communicate video data 108 from the camera 322 to the first communication device 102 (FIG. 1) through the communication elements 328. The video data 108 captured by the camera 322 may include sign language communication originated by the call assistant. The computing device 300 may also be configured to receive video data 108 from the first communication device 102 through the communication elements 328 to be displayed by the electronic display 324. The video data 108 received by the first communication device 102 may include sign language communication originated by the near-end user at the first communication device 102. The computing device 300 may also be configured to send and receive voice data 110 between the relay service 106 and the second communication device 104. As the communication sessions may include speech communications, the computing device 300 may include a microphone and a speaker (not shown) to enable such speech communications.

The processor 320 may coordinate the communication between the various devices as well as execute instructions stored in the memory device 330. The memory device 330 may include volatile and non-volatile memory storage for the computing device 300. In some embodiments, the relay service 106 may be configured to cause the communication system 100 to operate in a plurality of different modes of operation. The processor 320 and the memory device 330 may form a control circuit that is configured to determine which mode of operation the communication system 100 should operate in.

In some embodiments, the relay service 106 may be configured to cause the communication system 100 to operate in a text mode responsive to a determination that the far-end user is a live person operating the second communication device 104 that is participating in a communication session with the first communication device 102. The relay service may also be configured to cause the communication system 100 to operate in the tone mode responsive to a determination that the far-end user is not a live person operating the second communication device 104. Rather, the far-end user may be an automated computer system that employs synthesized voice and/or recorded voice.

In some embodiments the computing device 300 may be configured to detect a manual determination of whether a live person is operating the second communication device 104. For example, the input device 326 may be configured to receive a user selection indicating a result of the manual determination. By way of non-limiting example, the input device 326 may be configured to receive a user selection indicating whether a live person is operating the second communication device 104. Also by way of non-limiting example, the input device 326 may be configured to receive a user selection indicating whether the relay service 106 should operate in the text mode or the tone mode. The input device 326 may be configured to present selectable options directed to indicating whether a live person is operating the second communication device 104, which mode the relay service 106 should operate in, and combinations thereof.

In some embodiments, the computing device 300 may be configured to automatically determine whether a live person is operating the second communication device 104. For example, the processor 320 may be configured to analyze a speech signal from the second communication device 104 to automatically make the determination. The communication elements 328 may be configured to deliver the speech signal from the second communication device 104 to the processor 320.

In some embodiments, the processor 320 may be configured to enable the call assistant to manually override the automatic determination. By way of non-limiting example, the processor 320 may be configured to detect a user selection of a manual override option presented to the call assistant by the input device 326. In addition, in some embodiments, the processor 320 may be configured to enable the call assistant to confirm the automatic determination. By way of non-limiting example, the processor 320 may be configured to cause the input device 326 to prompt the user to confirm a result of the automatic determination.

In some embodiments, the processor 320 may be configured to cause the communication system 100 to switch from operating in one of the text mode and the tone mode to the other of the text mode and the tone mode responsive to a subsequent different determination of whether a live person is operating the second communication device 104. For example, a manual determination that a live person is operating the second communication device 104 may be made, and the processor 320 may cause the communication system 100 to operate in the text mode. The call assistant that made the manual determination may later decide that the second communication device 104 is transmitting speech signals corresponding to recorded speech. The call assistant may make the subsequent determination that no live person is operating the second communication device 104. The processor 320 may cause the communication system 100 to operate in the tone mode responsive to the subsequent determination that no live person is operating the second communication device 104.

In some embodiments, automatic determinations of whether a live person is operating the second communication device 104 may be made periodically throughout a communication session. For example, one of a manual and automatic determination may be made near a beginning of a communication session, and periodic automatic determinations may be subsequently made. Regardless of whether the first communication device 102 or the relay service 106 makes the automatic determination, the communication system may operate in the one of the text mode and the tone mode that corresponds to the most recent determination.

In some embodiments, one of the first communication device 102 and the relay service 106 may be configured to monitor communication signals from the second communication device 104. The one of the first communication device 102 and the relay service 106 may also be configured to cause subsequent manual or automatic determinations to be made responsive to changes in one or more characteristics of the communication signals from the second communication device 104. For example, a sudden increase or decrease in levels of background noise may be indicative of a change between recorded and live speech. Other changes in characteristics that may be significant include changes in channel characteristics, pitch of speech, loudness of speech, signal energy, other characteristics, and combinations thereof.

In some embodiments, the one of the first communication device 102 and the relay service 106 may be configured to cause the communication system 100 to default to operating in one of the text mode and the tone mode before the determination of whether a live person is operating the second communication device 104. Also, the one of the first communication device 102 and the relay service 106 may be configured to cause the communication system to default to operating in one of the text mode and the tone mode responsive to a failure to make an acceptable determination. For example, the one of the first communication device 102 and the relay service 106 may be configured to cause the communication system 100 to operate in the text mode unless there is a determination that the second communication device 104 is not operated by a live person.

Figure 4:
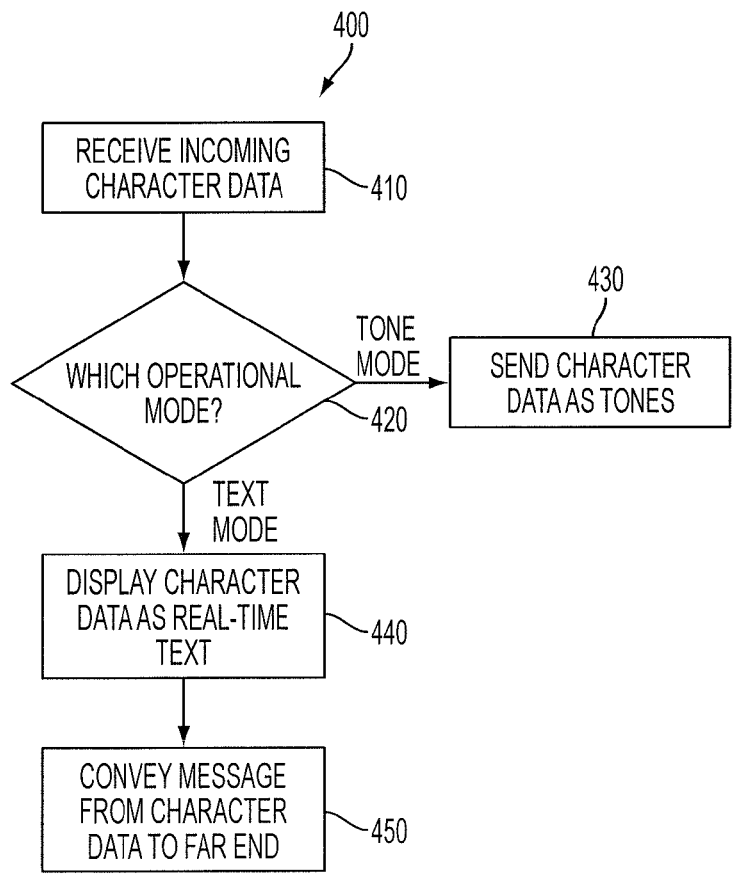
FIG. 4 is a flowchart illustrating a method of operating the communication system according to an embodiment of the present disclosure.

FIG. 4 is a flowchart 400 illustrating a method of operating a communication system 100 according to an embodiment of the present disclosure. At operation 410, the relay service 106 may receive incoming character data 107 in the form of an incoming text signal 109 from the first communication device 102. The text signal 109 may correspond to information desired to be conveyed by a near-end user to the second communication device 104. At operation 420, the relay service 106 may determine which operational mode the relay service 106 is operating in. The relay service 106 may determine an operational mode through a manual input of the call assistant (e.g., through a user interface), through an automatic determination by analyzing the audio data being received by the second communication device 104, through an automatic determination by the first communication device 102, or combinations thereof.

If the communication system 100 is in a tone mode (e.g., the far-end user is a computerized system that accepts DTMF tones), at operation 430 the relay service 106 may send tones 111 corresponding to the character data 107 to the second communication device 104 regardless of the format of the character data 107. In some embodiments, the relay service 106 may simply route the character data 107 to the second communication device 104 if the character data 107 is already configured as tones 111. In some embodiments, the relay service 106 may convert the character data 107 received as the text signal 109 to tones 111 that are transmitted to the second communication device 104.

If the communication system 100 is in the text mode (e.g., the far-end user does not accept DTMF tones, such as being a live person), at operation 440 the relay service 106 may display the character data 107 as real-time text on the electronic display 324 of the call assistant regardless of the format of the character data 107. For example, the relay service 106 may simply receive and display the character data as text with little, to no conversion, if the character data 107 is already a text signal 109. In some embodiments, the relay service 106 may convert the character data 107 to text if the character data 107 received in another format (e.g., tones 111).

At operation 450, the relay service 106 may convey the message to the second communication device 104, such as by the call assistant speaking the text displayed on the electronic display of the relay service 106 to the far-end user as voice data 110. In some embodiments, the second communication device 104 may be configured to accept textual signals. As a result, the relay service 106 may also be configured to transmit the information from the character data 107 to the second communication device 104 as textual data in addition to, or instead of, displaying the textual data to the call assistant to speak to the far-end user.

Figure 5:
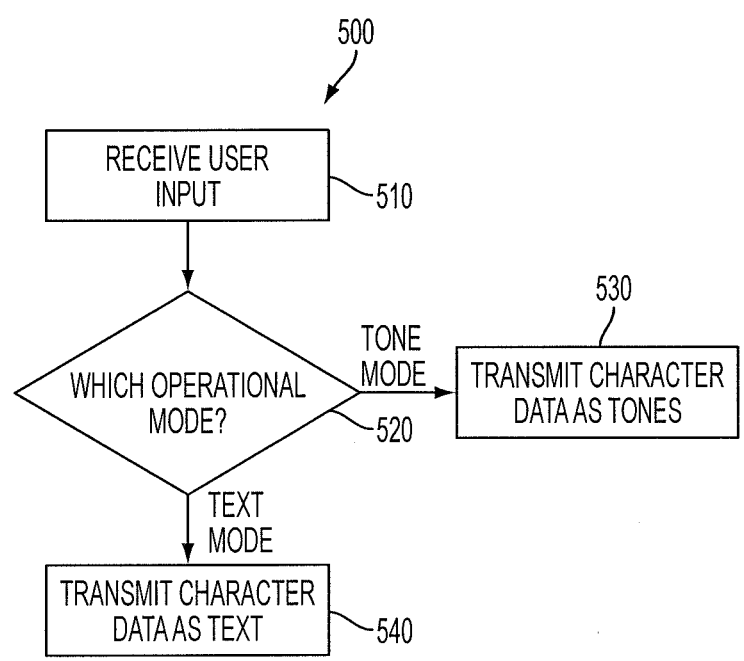
FIG. 5 is a flowchart illustrating a method of operating a communication system according to an embodiment of the present disclosure.

FIG. 5 is a flowchart 500 illustrating a method of operating a communication system 100 according to an embodiment of the present disclosure. At operation 510, the first communication device 102 may receive a user input corresponding to a desired message to convey to the second communication device 104. At operation 520, the first communication device 102 may determine which operational mode the communication system 100 is operating in. For example, the first communication device 102 may have received an indication from the relay service 106 a desired mode based on a determination by the relay service 106 that the far-end user is one of a live person or an automated system. In some embodiments, the first communication device 102 may perform at least some of the automated analysis of the far-end speech to automatically determine within the first communication device 102 which mode the communication system 100 should be operating in. The first communication device 102 may inform other devices of the communication system 100 of selected the mode.

If the communication system 100 is in a tone mode, at operation 530, the first communication device 102 may transmit the character data 107 as tones 111. If the communication system 100 is in the text mode, at operation 540, the first communication device 102 may transmit the character data 107 as a text signal 109. It should be noted that the embodiment of FIG. 5 describes a situation, in which the first communication device 102 may be aware of the operational mode (whether by its own detection or being informed of such). As discussed previously herein, it is contemplated that the first communication device 102 may not be aware of the operational mode. As such, the first communication device 102 may transmit the character data 107 to one or both of the relay service 106 and the second communication device 104 in a format that does not match how the relay service 106 and/or the second communication device 104 desires for the particular operational mode. Thus, the relay service 106 may convert the character data 107 to the appropriate format for the current operational mode.

Figure 6:
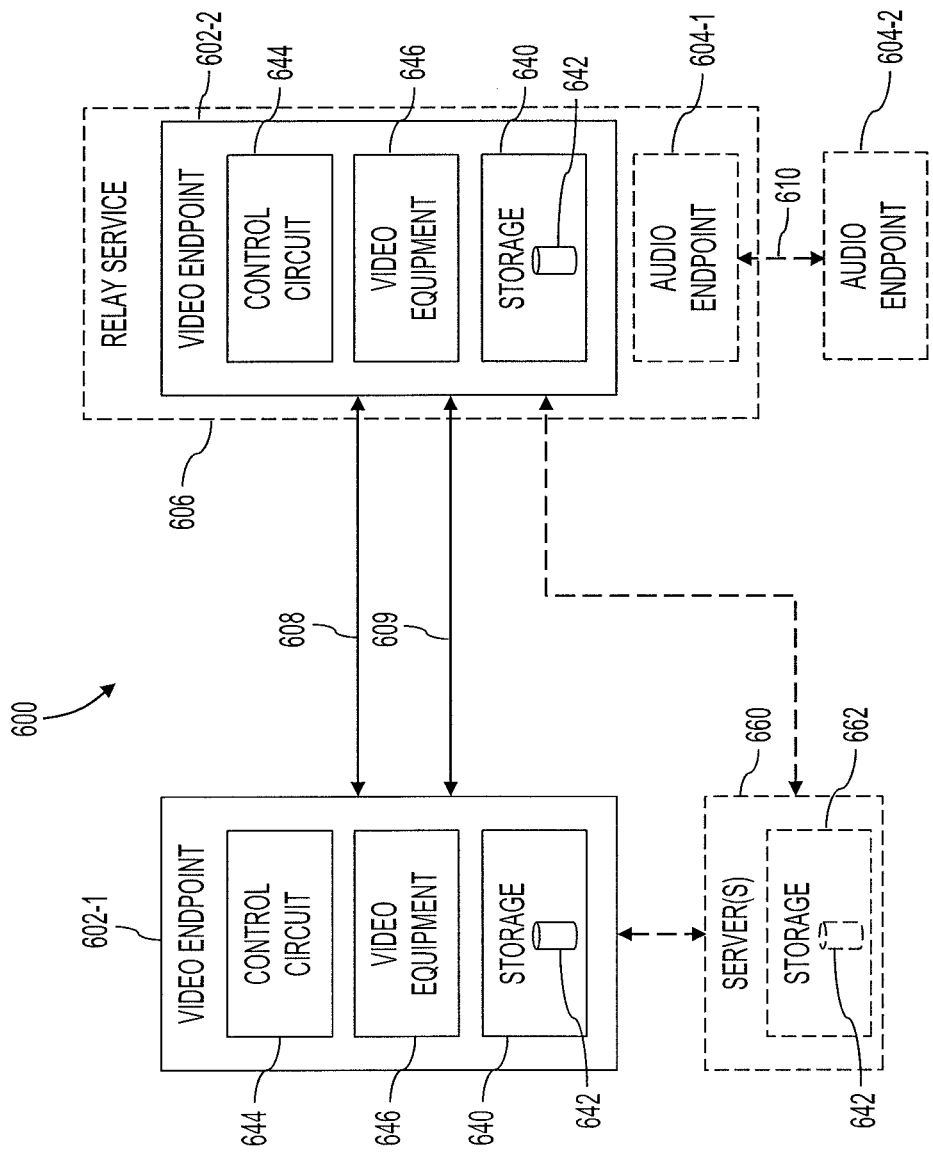
FIG. 6 is a simplified block diagram of a communication system according to an embodiment of the present disclosure.

FIG. 6 is a simplified block diagram of a communication system 600 according to embodiments of the present disclosure. The communication system 600 may include video endpoints 602-1 and 602-2 (sometimes referred to herein generally individually as "video endpoint" 602 and together as "video endpoints" 602), similar to the first communication device 102 of FIGS. 1 and 2. The video endpoints 602 may be configured to communicate video 608 and text 609 to each other, similar to the first communication device 102 communicating video 108 and text 109 to the relay service 106, as discussed above with reference to FIG. 1. Accordingly, the video endpoints 602 may include communication devices for audibly-impaired users (e.g., video phones).

Each of the video endpoints 602 may include video equipment 646 (e.g., including the camera 222 and the electronic display 224 of FIG. 2), a control circuit 644 and a data storage 640 (also referred to herein simply as "storage" 640). The storage 640 may include a database 642 for storing strings of text that may be selected and sent to another of the video endpoints 602 as text 609 without a user of the video endpoint 602 having to type out the strings of text during a video call with the other video endpoint 602. In other words, rather than input characters one at a time using an input device 226 (FIG. 2) to send text 609 to the other video endpoint 602, the user may instead select one of the text strings stored in the database 642, and the video endpoint 602 may transmit the selected text string to the other video endpoint 602. The ability to select and transmit text strings without having to provide character inputs one by one may be especially useful where the input device 226 includes a cumbersome character selection interface. For example, a video phone may include a remote control for providing character inputs, which may provide for a cumbersome character selection interface relative to a character selection interface such as a keyboard.

The database 642 may store text strings that correspond to textual information that the user frequently provides during video calls. By way of non-limiting example, the database 642 may store text strings conveying account numbers, mailing addresses, email addresses, telephone numbers, prescription information, payment information, driving instructions, restaurant orders, and other information that may be conveyed by text during a video call.

As a specific, non-limiting example, the database 642 of the video endpoint 602-1 may store a text string including a residential address of the user of the video endpoint 602-1. The user of the video endpoint 602-1 may place a video call to another user of another video endpoint 602-2 to tell the other user where the user's place of residence is located. The other user may answer the user's call, and video communications may be established between the video endpoints 602 (e.g., video 608 is exchanged between the video endpoints 602). The other user may ask the user for the user's residential address. Rather than tediously signing the residential address to the other user (e.g., using American Sign Language (ASL)), or inputting characters one by one using a cumbersome text interface, the user may instead issue commands to the video endpoint 602-1 to send the text string including the residential address stored in the database 642 to the other video endpoint 602-2. In response, the video endpoint 602-1 may send the text string including the user's residential address to the other video endpoint 602-2, which may display the text string to the other user.

In some embodiments, the text strings may be stored in a database 642 at a remote server 660 (e.g., a computing device) instead of, or in addition to, the databases 642 of the video endpoints 602. Accordingly, the server 660 may include a storage 662 for storing the database 642. The video endpoints 602 may communicate with the server 660 to access the database 642 (e.g., using communication elements 228 discussed above with reference to FIG. 2). By way of non-limiting example, the video endpoints 602 may retrieve text strings from the database 642 of the server 660, and transmit the retrieved text strings to another video endpoint 602 for display by the other video endpoint 602. Also by way of non-limiting example, the video endpoints 602 may instruct the server 660 to transmit the text strings directly to another video endpoint 602 for display by the other video endpoint 602.

The server 660 may enable sharing of the text strings in the database 642 among several video endpoints 602 that are operated by the same user. For example, the user may own several video endpoints 602, including a home video phone, a work video phone, and a mobile computing device modified with software to operate as a video endpoint 602. The user may change the database 642 using one of the video endpoints 602 by adding text strings to, removing text strings from, or modifying text strings in the database 642. The changed database 642 may be available to any of the other video endpoints 602 operated by the user. Accordingly, the user would not need to enter the same text strings into each of the separate video endpoints 602 operated by the user.

It should be noted that security measures may be taken to protect information in the database 642 of the server 660 as the text strings may include information that is confidential or sensitive (e.g., credit card numbers, social security numbers, account numbers, contact information, etc.). For example, encryption, firewalls, other security measures, and combinations thereof may be taken to protect the information in the database 642 while being stored, while being communicated, or a combination thereof. In some embodiments, measures similar to those required for credit card transaction systems by the Payment Card Industry Security Standards Council® may be taken to protect the information in the database 642 of the server 660.

In some embodiments, one of the video endpoints 602 may be part of a relay service 606 configured to provide translation services to enable audibly-impaired users of video endpoints 602 to communicate with an audibly-capable user of an audio endpoint 604-2 (e.g., traditional or cellular telephones). For example, the relay service 606 may include the video endpoint 602-2 to enable video communications between a call assistant at the relay service 606 and a user of video endpoint 602-1. The relay service 606 may also include an audio endpoint 604-1 configured to enable the translator to communicate with an audibly-capable user of another audio endpoint 604-2 using audio 610. It should be noted that, although the video endpoint 602-2 and the audio endpoint 604-1 of the relay service 606 are illustrated separately, the video endpoint 602-2 and the audio endpoint 604-1 may be integrated together, separately, or a combination thereof.

In embodiments where the communication system 600 includes a relay service 606, the audibly-impaired user may select and send one of the text strings stored in the database 642 of the video endpoint 602-1 to the video endpoint 602-2 of the relay service 606. The selected text string may be displayed to the call assistant at the relay service 606, and the call assistant may speak the contents of the text to the audibly-capable user of the audio endpoint 604-2.

As a specific, non-limiting example, an audibly-impaired user of the video endpoint 602-1 may have a description of a favorite pizza that the audibly-impaired user frequently orders from a pizza restaurant stored in the database 642 of the video endpoint 602-1. The audibly-impaired user may call the pizza restaurant with the assistance of the relay service 606. A video connection may be established between the video endpoint 602-2 of the relay service 606 and the video endpoint 602-1. Also, an audio connection may be established between the audio endpoint 604-1 of the relay service 606 and the audio endpoint 604-2 (e.g., a telephone) at the pizza restaurant. Instead of signing the description of the pizza to the translator at the relay service 606, the audibly-impaired user may input commands to the video endpoint 602-1 to transmit the text string having the description of the favorite pizza to the video endpoint 602-2 of the relay service 606. The text string having the description of the favorite pizza may be displayed to the call assistant at the relay service 606. The call assistant may speak the description of the favorite pizza to an audibly-capable worker at the pizza restaurant, and the audio endpoint 604-1 of the relay service 606 may transmit the audio description to the audio endpoint 604-2 at the pizza restaurant via the audio 610. Accordingly, the audibly-impaired user may make a pizza order without having to sign the description of the pizza to the translator, and without having to input text characters of the description of the pizza one-by-one during the call.

In some embodiments, the video endpoint 602 may be configured to enable the user to select a text string for transmitting to other video endpoint 602, and modify the text string. Such modification may occur either before or after the text string has been transmitted. In the example of the pizza order, perhaps the audibly-impaired user desires to order the favorite pizza, but with an additional topping not listed in the text string. The audibly-impaired user would thus be enabled to select the text string describing the favorite pizza for transmitting to the other video endpoint 602, and then add text describing the extra topping.

In some embodiments, the video endpoints 602 may transmit text strings using a real-time text protocol. In such embodiments, a text string may be selected and the text string may be transmitted to and displayed by the other video endpoint 602 in at least substantially real-time. The user may then modify the text string, and the modifications may be displayed in substantially real-time by the other video endpoint 602 to the other user as the modifications are made.

In some embodiments, the video endpoint 602 may provide the user an opportunity to modify text strings before transmittal to the other video endpoint 602. For example, a user may select a text string, modify the text string, and then provide the video endpoint 602 instructions to transmit the modified text string to the other video endpoint 602. The video endpoint 602 may transmit the modified text string, and the other video endpoint 602 may receive and display the modified text string.

The video endpoints 602 may also be configured to enable the user of the video endpoint 602 that transmitted a text string to delete or remove the text string from the display of the other video endpoint 602 that received the text string.

In some embodiments, after a user transmits a text string from a video endpoint 602 to another video endpoint 602, another user at the other video endpoint 602 may modify the text string, which may be displayed both on the other video endpoint 602 and the video endpoint 602. Either or both of the users may save the modified text string to their respective databases 642.

In some embodiments, the video endpoint 602 may be configured to embed the text to be transmitted to the other video endpoint 602 into the video 608 sent to the other video endpoint 602. In such embodiments, the text may be displayed by the other video endpoint 602 as part of the video 608 transmitted to the other video endpoint 602. Accordingly, in such embodiments, text 609 separate from the video 608 may not be transmitted between video endpoints 602.

In some embodiments, the video endpoint 602 may be capable of both sending video 608 with the text embedded therein, and sending text 609 separate from the video 608. In some embodiments, the video endpoint 602 may be configured to determine whether or not it is communicating with another video endpoint that is capable of receiving text 609 that is separate from the video 608. In such embodiments, the video endpoint 602 may transmit text 609 that is separate from the video 608 if the video endpoint 602 determines that the other video endpoint is capable of receiving separate text 609 and video 608. Also, the video endpoint 602 may transmit video 608 with the text embedded into the video 608 if the video endpoint 602 determines that the other video endpoint is not capable of receiving separate text 609 and video 608. As a result, the video endpoint 602 may be capable of conveying text, and text strings, to the other user of the other video endpoint 602 even if the other video endpoint 602 is not configured with similar text communication capabilities as the video endpoint 602.

The functions discussed above with reference to the video endpoints 602 may be carried out, in large part, by the control circuit 644 of each video endpoint 602. In addition, the control circuit 644 may be configured to provide a user interface (e.g., the graphical user interface 800 illustrated in and discussed with reference to FIGS. 8A through 8D) to enable the audibly-impaired user to use the video endpoint 602. In some embodiments, the control circuit 644 may include a microcontroller, a central processing unit, a field programmable gate array, an application specific integrated circuit (ASIC), a programmable logic controller (PLC), a system on chip, other circuits, or combinations thereof.

In some embodiments, the control circuit 644 may include a computing device including at least one processing element 220 and at least one memory device 230, as illustrated in FIG. 2. The memory device 230 may include computer-readable instructions directed at least to providing the user interface. The processing element 220 may be configured to execute the computer-readable instructions of the memory device 230. Accordingly, the computer-readable instructions transform the computing device from a general-purpose computer into a special purpose computer configured for carrying out embodiments of the present disclosure. By way of non-limiting example, the control circuit 644 may include a microcontroller configured to execute computer-readable instructions stored internally or externally to the microcontroller. Also by way of non-limiting example, the control circuit 644 may include a central processing unit (CPU) (e.g., of a desktop personal computer (PC), a laptop computer, a tablet computer, a smartphone, a PDA, etc.) configured to execute the computer-readable instructions in an operating system environment.

In some embodiments, the control circuit 644 may include an array of logic circuits arranged and interfaced in a manner selected to perform at least a portion of the functions the control circuit 644 is configured to perform. By way of non-limiting example, the control circuit 644 may include an array of logic circuits interfaced with programmable switches that are positioned in a manner selected to carry out the functions that the control circuit 644 is configured to perform (e.g., an FPGA). Also by way of non-limiting example, the array of logic circuits may be interfaced using hard-wired interfaces (e.g., an ASIC).

Figure 7:
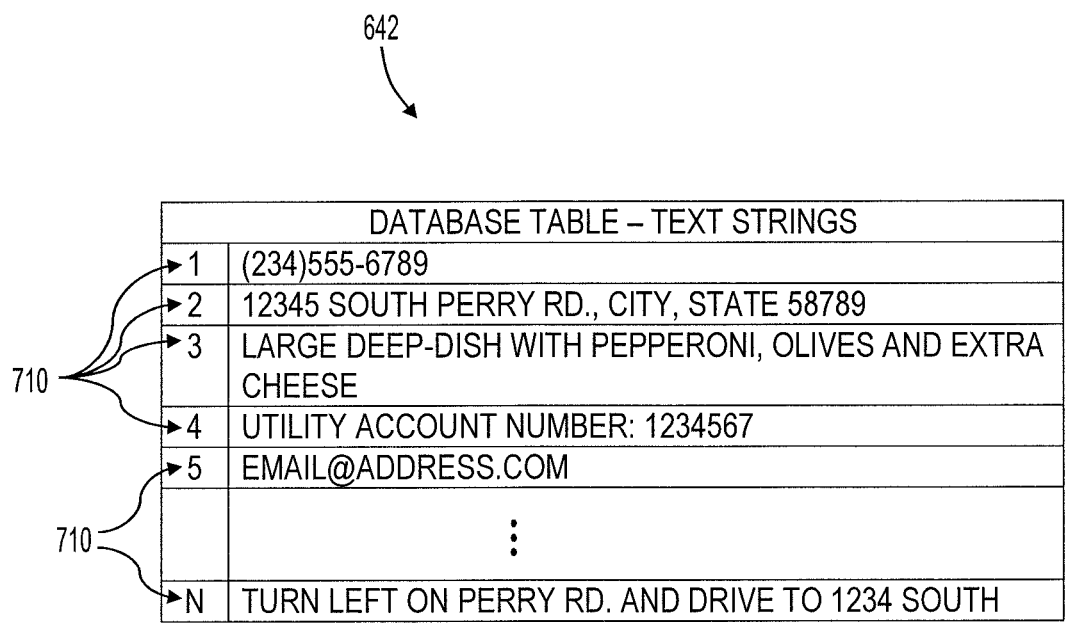
FIG. 7 is a block diagram illustrating entries in a database of the communication system of FIG. 6.

FIG. 7 is a block diagram illustrating entries in the database 642 of FIG. 6. The database 642 may be thought of as a list of text strings 710 that may be selected and transmitted to other video endpoints 602 (FIG. 6). While not illustrated, other fields may be included for each database entry, such as fields related to specific contacts, groups of contacts, various categories, and other information that may be useful in filtering or selecting specific database entries.

Similar to the communication devices 102 (FIGS. 1 and 2) discussed above, the video endpoints 602 may each include an input device 226 (FIG. 2). The input device 226 may include a keypad, a keyboard, a touchscreen, a remote control, a mouse, other input device, or combinations thereof configured to enable the user to initiate video communications with other users of other video endpoints 602 (e.g., by interacting with an electronic contacts list, entering unique identifiers corresponding to other video endpoints 602, etc.). In addition, the user may be able to interact with the database 642 using the input device 226. For example, the user may create and add new text strings 710 to the database 642, or delete or modify existing text strings 710 in the database 642.

As non-limiting examples, the database 642 illustrated in FIG. 7 includes text strings 710 including the user's telephone number, address, favorite pizza order, utility account number, email address, and driving instructions to the user's place of residence.

In some embodiments, the text strings 710 may be categorized and sortable by category. By way of non-limiting example, a category may be created for the user's account numbers, and all the text strings 710 including account numbers may be categorized in the account numbers category. Also by way of non-limiting example, a category may be created for the user's contact information, and all the text strings 710 including the user's contact information (e.g., phone number, residential address, work address, email address, etc.) may be categorized in the contact information category. In some embodiments, a single text string 710 may be categorized in more than one category.

FIGS. 8A through 8D are examples of a simplified graphical user interface 800 of a video endpoint 602 of FIG. 6. The graphical user interface 800 may be configured to enable a user to communicate using text, and access the database 642 (FIGS. 6 and 7) during a video call with another user of another video endpoint 602. The graphical user interface 800 may include a video field 810 for displaying video (e.g., of the other user) from video data 608 received from the other video endpoint 602. The graphical user interface 800 may also include a text editing field 830 configured to enable a user to input and modify text. Text in the text editing field 830 may be displayed by the other video endpoint 602 to the other user of the other video endpoint 602 during video communications with the other video endpoint 602. In other words, the video endpoint 602 may send text data 609 (or text embedded into the video 608) including the text in the text editing field 830 to the other video endpoint 602 for display by the other video endpoint 602.

Figure 8A:
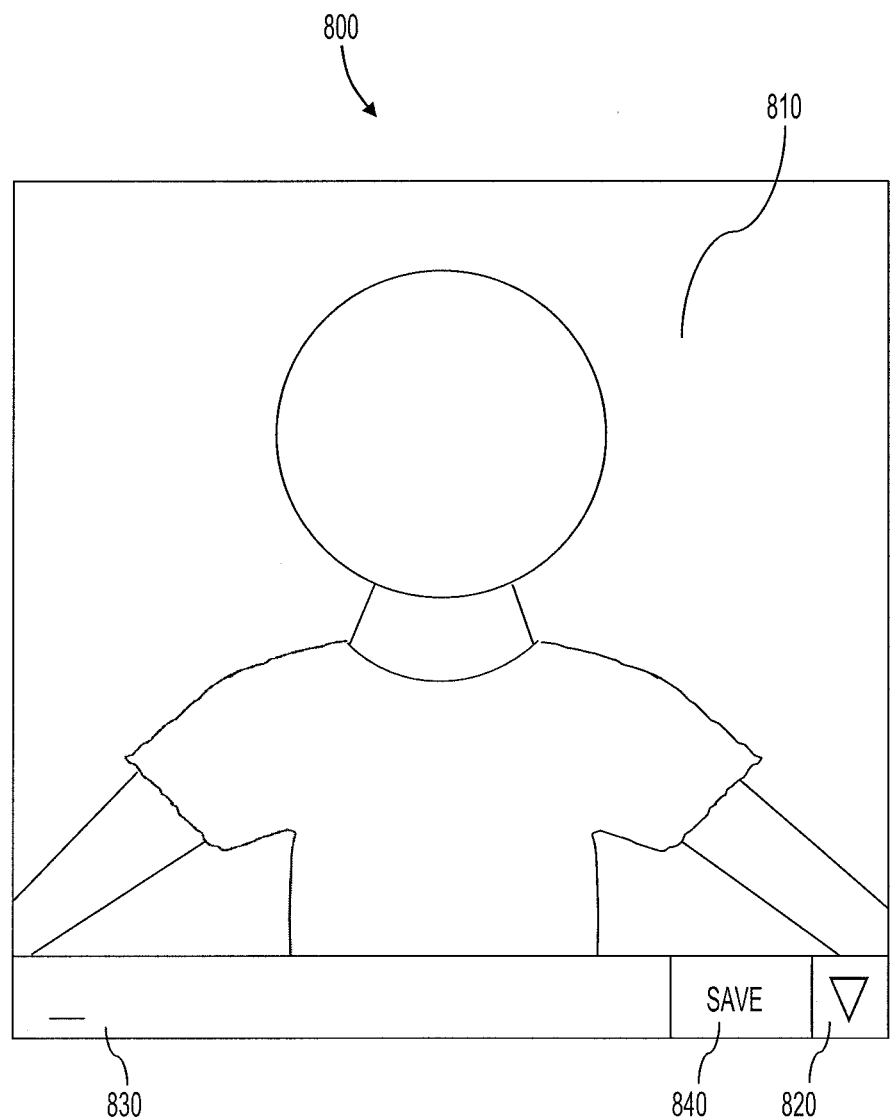
FIGS. 8A through 8D are examples of a simplified graphical user interface of a video endpoint of the communication system of FIG. 6.
Figure 8B:
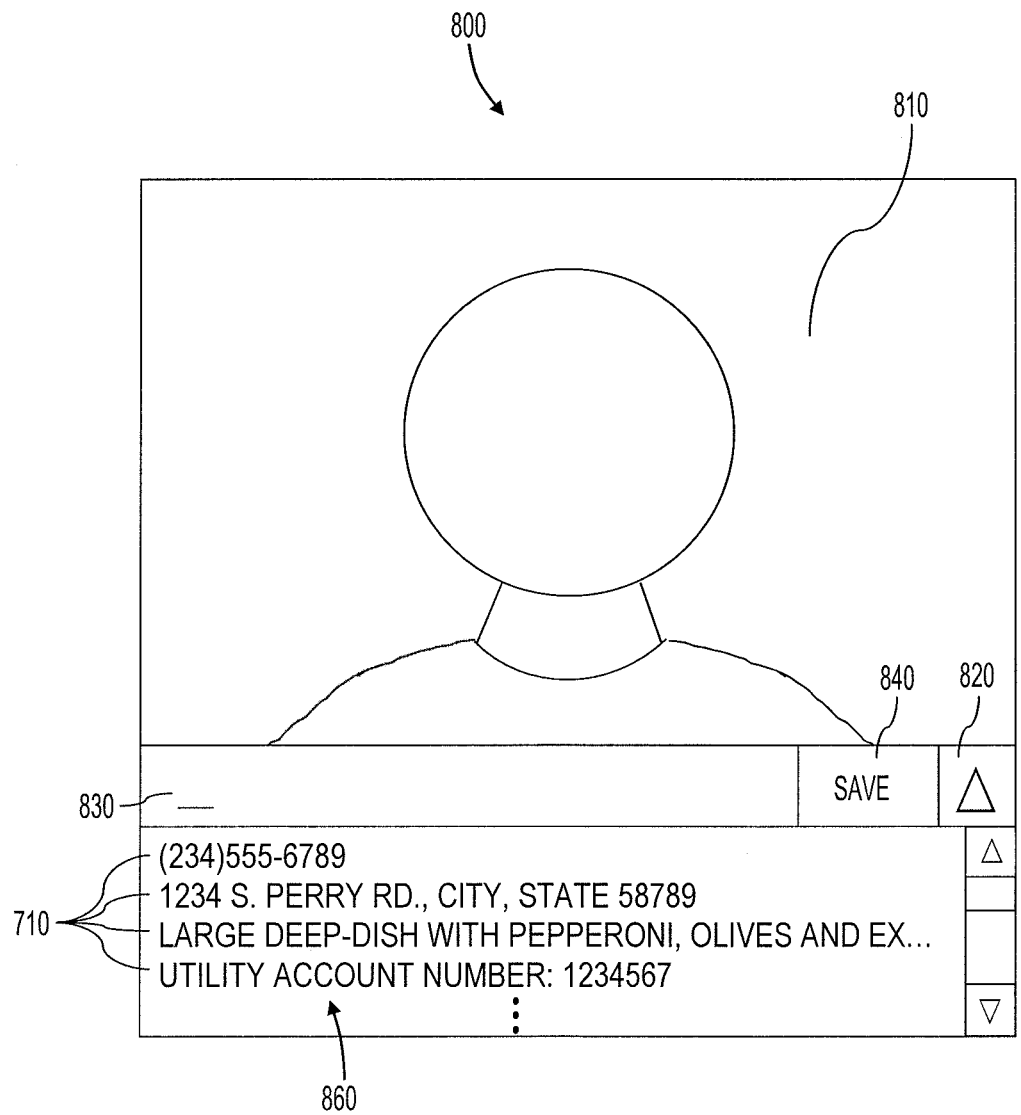

The graphical user interface 800 may also be configured to enable the user to select from text strings 710 saved in the database 642. For example, responsive to the user selecting a dropdown selection 820, the graphical user interface 800 may present a list 860 of the text strings 710 saved in the database 642, as shown in FIG. 8B. The order in which the text strings 710 are displayed may be based upon the number of times each of the text strings 710 have been used, the order in which the text strings 710 were added to the database 642, alphabetical order, a user defined order, or some other ordering protocol. In some embodiments, the user may be enabled to switch between the different ordering protocols.

Each of the text strings 710 displayed in the list 860 of the text strings 710 may be user-selectable. Responsive to a user selecting one of the text strings 710 from the list 860 of text strings 710, the selected text string 710 may be displayed in the text editing field 830, and transmitted by the video endpoint 602 to the other video endpoint 602 for display by the other video endpoint 602.

Figure 8C:
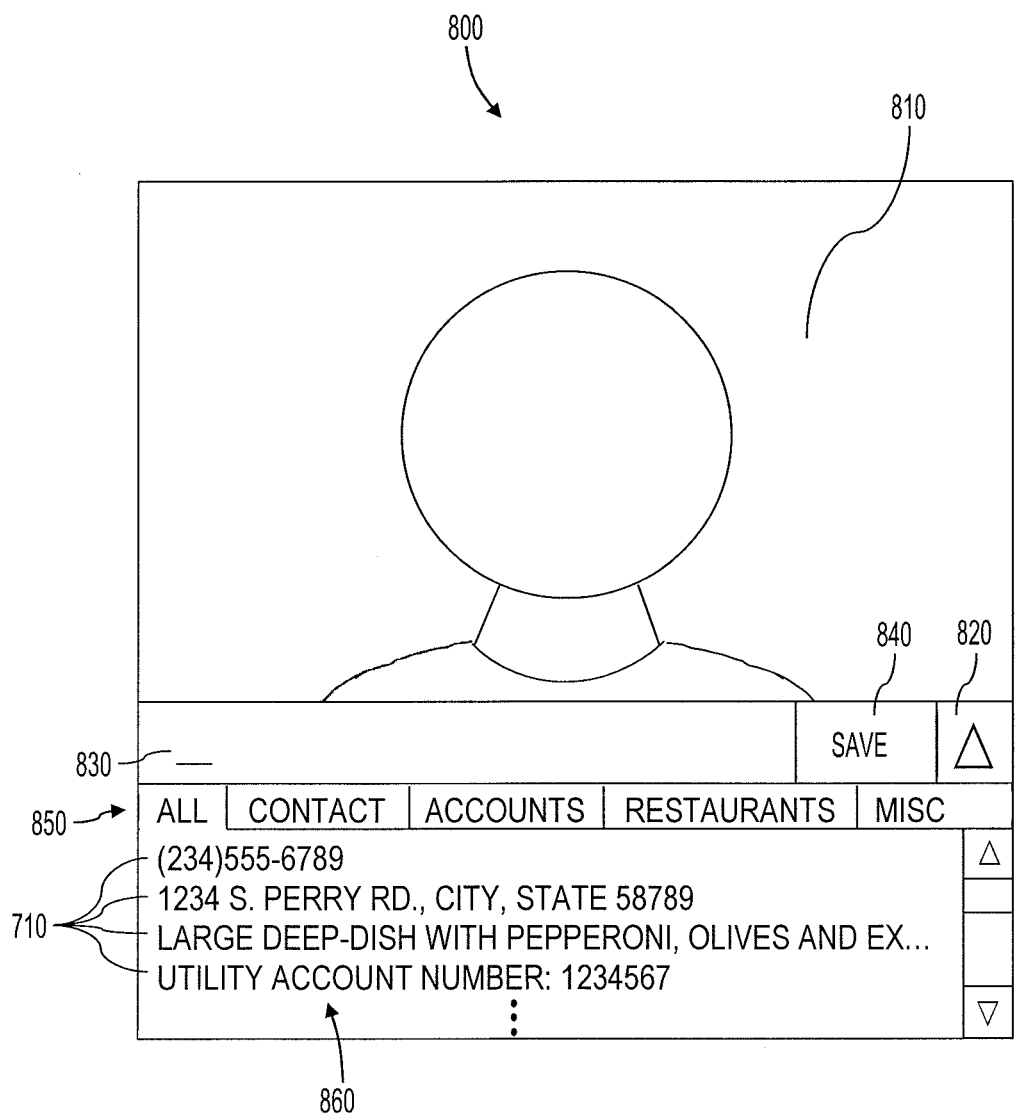

In some embodiments, the list 860 of text strings 710 may be organized in categories 850, as illustrated in FIG. 8C. The categories 850 may be user-selectable. Responsive to a user selection of one of the categories 850 the graphical user interface 800 may display a list 860 of the text strings 710 that are categorized in the selected category 850. For example, FIG. 8C illustrates an "ALL" category as selected. Consequently, all the text strings 710 are displayed in the list 860 of FIG. 8C.

Figure 8D:
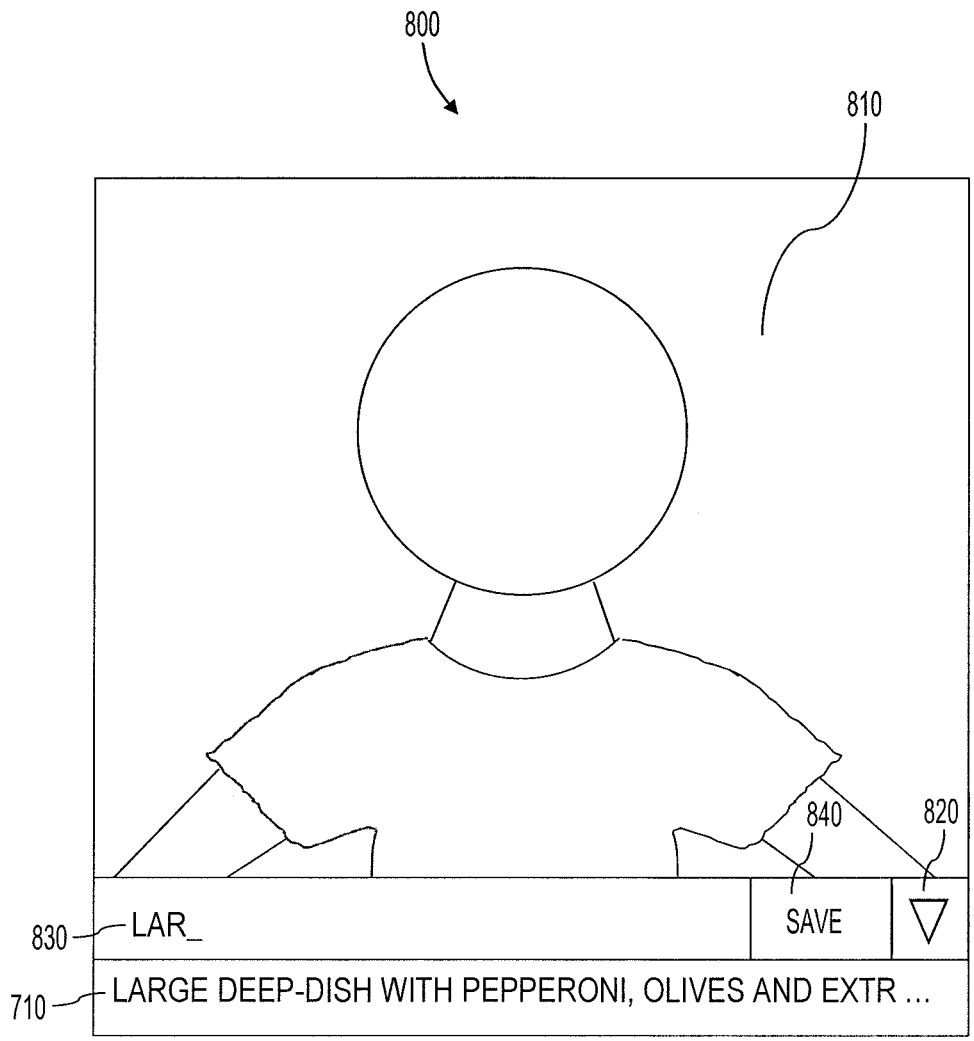

In some embodiments, when the user begins typing text into the text editing field 830, the user interface may automatically list text strings 710 saved in the database 642 that may match what the user is typing. The text strings 710 listed below the text editing field 830 may be user-selectable, and a selected text string 710 may be displayed in the text editing field 830. For example, as shown in FIG. 8D, the letters "Lar" are shown typed into the text editing field 830. As a result, the user-selectable text string 710 "Large deep-dish with pepperoni, olives, and extra cheese" is listed below the text editing field 830.

In some embodiments, one or more of the text strings 710 may be associated with hotkeys (e.g., selections of a key or a combination of multiple keys using a keypad or a keyboard). In other words, the user interface 800 may display the one of the text strings 710 in the text editing field 830 that is associated with a hotkey that has been selected by the user. The graphical user interface 800 may also be configured to enable the user to assign hotkeys to the various text strings 710.

The graphical user interface 800 may also be configured to enable the user to save text from the text editing field 830 to the database 642 as a text string 710. For example, the graphical user interface 800 may include a save selection 840. Responsive to a user selection of the save selection 840, text from the text editing field 830 may be saved as a text string 710 to the database 642 (FIGS. 6 and 7). In some embodiments, the user may be prompted to select one or more categories 850 to which the saved text string 710 should belong. Consequently, if the user finishes typing a text string 710 in the text editing field 830 and decides that the text in the text string 710 may be useful in a later conversation, the user may save the text string 710 for later use.

Although not illustrated, the graphical user interface 800 may be configured to enable other functions. For example, the graphical user interface 800 may be configured to enable the user to save over an existing text string 710 (e.g., change the text string 710 and save the changes). Also, the graphical user interface 800 may be configured to enable the user to delete text strings 710 from the database 642. The graphical user interface 800 may further be configured to enable the user to create, remove, and modify text strings 710 while not participating in a video call with another user. In addition, the graphical user interface 800 may be configured to enable the user to save text received from the other video endpoint 602 to the database 642 as text strings 710.

Although also not illustrated, the graphical user interface 800 may include options that enable the audibly-impaired user to participate in video communications. By way of non-limiting example, the graphical user interface 800 may include options that enable the audibly-impaired user to place and answer video calls. Those of ordinary skill in the art will appreciate that the graphical user interface 800 may provide many other options known in the art of video communications for audibly-impaired persons.

Figure 9:
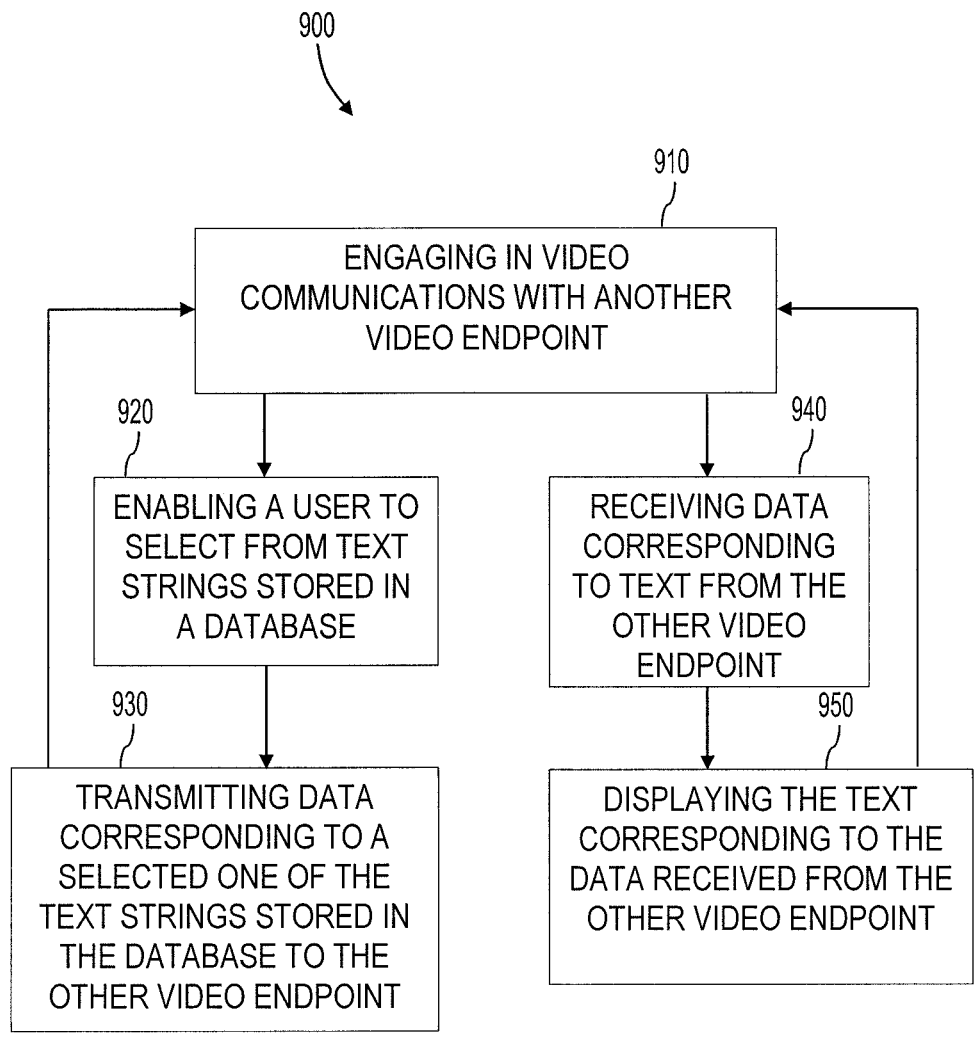
FIG. 9 is a simplified flowchart illustrating a method of operating the video endpoint of FIG. 6.

FIG. 9 is a simplified flowchart 900 illustrating a method of operating a video endpoint 602 of FIG. 6. Referring to FIGS. 6 and 9 together, at operation 910, the method may include engaging in video communications with another video endpoint 602. Engaging in the video communications with the other video endpoint 602 may include transmitting and receiving video 608 to and from the other video endpoint 602.

At operation 920, the method may include enabling an audibly-impaired user of the video endpoint 602 to select from text strings 710 (FIG. 7) stored in a database 642. In some embodiments, enabling the audibly-impaired user to select from the text strings 710 may include enabling the audibly-impaired user to select from text strings 710 stored in a storage 640 of the video endpoint 602. In some embodiments, enabling the audibly-impaired user to select from the text strings includes accessing a storage 662 of a server 660. In some embodiments, enabling the audibly-impaired user of the video endpoint 602 to select from the text strings 710 includes providing a user interface, such as, for example, the graphical user interface 800 of FIGS. 8A through 8D.

At operation 930, the method may include transmitting data corresponding to a selected one of the text strings 710 stored in the database 642 to the other video endpoint 602 during the video communications for display by the other video endpoint 602 responsive to the audibly-impaired user selecting the selected one of the text strings 710. In some embodiments, transmitting the data corresponding to the selected one of the text strings 710 may include transmitting separate text 609 and video 608 to the other video endpoint 602. In some embodiments, transmitting the data corresponding to the selected one of the text strings 710 may include transmitting video 608 with the text embedded therein. In some embodiments, transmitting the data corresponding to the selected one of the text strings 710 may include transmitting the data using a real-time text protocol. In some embodiments, transmitting the data corresponding to the selected one of the text strings 710 may include transmitting text 609 to the other video endpoint 602 if it is determined that the other video endpoint 602 is capable of receiving text 609, and transmitting video 608 with the text embedded therein if it is determined that the other video endpoint 602 is not capable of receiving text 609.

Returning to operation 910, during the video communications with the other video endpoint 602, at operation 940 the method may include receiving data corresponding to text from the other video endpoint 602. In some embodiments, receiving the data corresponding to the text from the other video endpoint 602 may include receiving separate text 609 and video 608 from the other video endpoint 602. In some embodiments, receiving the data corresponding to the text from the other video endpoint 602 may include receiving text embedded into the video 608.

At operation 950, the method may include displaying the text corresponding to the data received from the other video endpoint 602. In some embodiments, displaying the text may include displaying the text on an electronic display 224 (FIG. 2) of the video endpoint 602. In some embodiments, displaying the text may include displaying the text in a text editing field 830 of a graphical user interface 800 (FIG. 8). In some embodiments, displaying the text may include displaying the text in a video field 810 of the graphical user interface 800.

Figure 10:
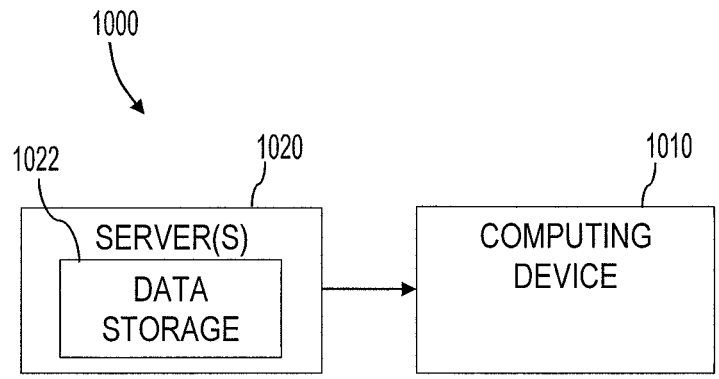
FIG. 10 is a simplified block diagram of a communication system for transforming a computing device into a video endpoint of FIG. 6.

FIG. 10 is a simplified block diagram of a communication system 1000 for transforming a computing device 1010 into a video endpoint 602 of FIG. 6. The communication system 1000 may include the computing device 1010 and one or more servers 1020 (hereinafter referred to as "servers" 1020). The servers 1020 may include one or more data storage devices 1022 (hereinafter referred to as "storage" 1022). The storage 1022 may include computer-readable instructions directed to instructing the computing device 1010 to perform the functions discussed herein with reference to the video endpoint 602 of FIG. 6. For example, the computer-readable instructions may be directed to instructing the computing device 1010 to provide a user interface to an audibly-impaired user (e.g., the graphical user interface 800 of FIGS. 8A through 8D) to enable the audibly-impaired user to select from text strings 710 stored in a database 642 (FIG. 7) and transmit a selected one of text strings 710 to another video endpoint 602 for presentation to another user.

The servers 1020 may be configured to communicate with the computing device 1010 (e.g., through the Internet). By way of non-limiting example, the servers 1020 may be configured to provide an online mobile software application store, and the computing device 1010 may include a mobile device configured to access the mobile software application store. The servers 1020 may transmit data corresponding to the computer-readable instructions to the computing device 1010. The computing device 1010 may be configured to execute the computer-readable instructions. Accordingly, the computing device 1010 may be transformed into a video endpoint 602.

Also by way of non-limiting example, the servers 1020 may be configured to provide computer-readable instructions that may be executed by a desktop or laptop computer in an operating system environment. For example, the computer-readable instructions may be configured as software applications that may be executed in the operating system environment. As a further example, the computer-readable instructions may include one or more web applications that may be executed through the computer's web browsing software (e.g., using javascripts). Other configurations for the delivery of the computer-readable instructions to the computing device 1010 are also contemplated within the scope of the present disclosure.

Figure 11:
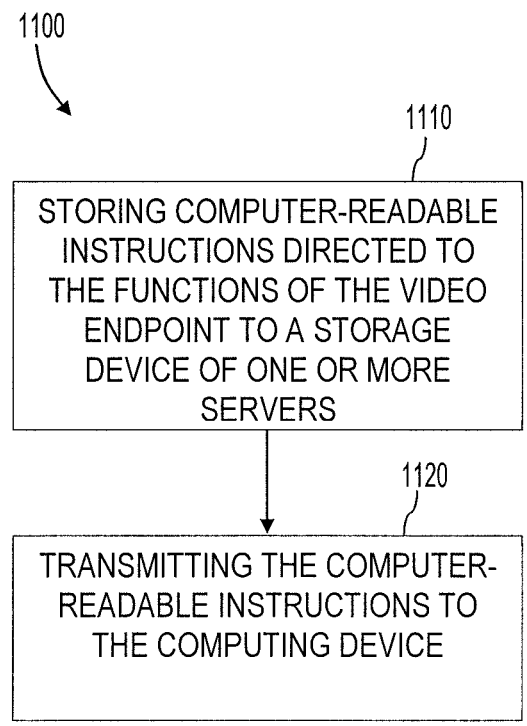
FIG. 11 is a simplified flowchart illustrating a method of transforming the computing device of FIG. 10 into a video endpoint of FIG. 6.

FIG. 11 is a simplified flowchart 1100 illustrating a method of transforming the computing device 1010 of FIG. 10 into a video endpoint 602 of FIG. 6. Referring to FIGS. 6, 10, and 11 together, at operation 1110, the method may include storing computer-readable instructions on a storage 1022 of the servers 1020. The computer-readable instructions may be directed to instructing the computing device 1010 to provide a user interface to an audibly-impaired user. The user interface may be configured to enable the audibly-impaired user to communicate with another user of another video endpoint 602 with text during video communications with the other user, and enable the audibly-impaired user to select from text strings 710 (FIG. 7) stored in a database 642 (FIG. 6). The computer-readable instructions may also be directed to instructing the computing device 1010 to transmit a selected one of the text strings 710 to the other video endpoint 602 for presentation to the other user.

At operation 1120, the method may include transmitting the computer-readable instructions to the computing device 1010. Transmitting the computer-readable instructions may include transmitting a mobile software application, a software application configured for execution in a computer operating system environment, web application scripts, other computer-readable instruction configurations, and combinations thereof.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A video endpoint, comprising:
video equipment configured to enable an audibly-impaired user to engage in video communication sessions with another user of another video endpoint; and
at least one control circuit operably coupled with the video equipment, the at least one control circuit configured to:
provide a user interface to the audibly-impaired user, the user interface configured to:
enable the audibly-impaired user to manage a database of text strings including adding new text strings to the database, removing text strings from the database, or modifying the text strings stored in the database; and
enable the audibly-impaired user to select from text strings stored in a database without requiring the audibly-impaired user to input individual characters of the selected text string during an ongoing video communication session with another video endpoint;
transmit, in a non-tone-based real-time text (RTT) format, the user-selected text string to the another video endpoint for presentation to the other user during the ongoing video communication session; and
access the database as a shared database such that changes made to the text strings stored in the database are available to other video communication devices that are operated by the same audibly-impaired user.

2. The video endpoint of claim 1, further comprising a data storage device operably coupled with the at least one control circuit, the data storage device comprising the database of text strings for the video endpoint to locally access the text strings.

3. The video endpoint of claim 1, wherein the at least one control circuit is configured to communicate with a remote server including a data storage device comprising the database for the video endpoint to remotely access the text strings.

4. The video endpoint of claim 1, wherein the user interface is configured to enable the audibly-impaired user to add the new text strings to the database during the ongoing video communication session.

5. The video endpoint of claim 1, wherein the video endpoint is configured to send video data to the another video endpoint with the user-selected text string embedded into the video data such that the user-selected text string is displayed by the another video endpoint during the ongoing video communication session as part of video corresponding to the video data.

6. The video endpoint of claim 1, wherein the at least one control circuit is configured to transmit the user-selected text string separate from the video data to the another video endpoint during the ongoing video communication session.

7. The video endpoint of claim 1, wherein the user interface is further configured to:
present text received from the another video endpoint during the ongoing video communication session; and
enable the audibly-impaired user to save the text received from the another video endpoint during the ongoing video communication session as a new text string to the database such that is subsequently available for selection by the audibly-impaired user.

8. The video endpoint of claim 1, wherein the at least one control circuit is configured to associate the text strings with categories, and present the text strings organized in the categories within the user interface for selection during the on-going video communication session.

9. The video endpoint of claim 1, wherein the at least one control circuit comprises:
at least one memory device including computer-readable instructions directed to providing the user interface and to performing acts the at least one control circuit is configured to perform; and
at least one processing element operably coupled to the at least one memory device and configured to execute the computer-readable instructions of the at least one memory device.

10. A video endpoint, comprising:
video equipment configured to enable an audibly-impaired user to engage in video communication sessions with another user of another video endpoint; and
at least one control circuit operably coupled with the video equipment, wherein the at least one control circuit is configured to:
provide a user interface to the audibly-impaired user, the user interface configured to:
enable the audibly-impaired user to manage a database of text strings including adding new text strings to the database, removing text strings from the database, or modifying the text strings stored in the database; and
enable the audibly-impaired user to select from text strings stored in a database during an ongoing video communication session with another video endpoint without requiring the audibly-impaired user to input individual characters of the selected text string; and
transmit the user-selected text string from the text strings to the another video endpoint for presentation to the other user; and
access the database as a shared database such that changes made to the text strings stored in the database are available to other video communication devices that are operated by the same audibly-impaired user.

11. A method of operating a video endpoint for audibly-impaired users, the method comprising:
engaging in an ongoing video communication session with another video endpoint;
displaying text strings stored in a database in a graphical user interface of the video endpoint during the ongoing video communication session;
selecting a text string from the displayed text strings responsive to a user input from the audibly-impaired user during the ongoing video communication session without requiring the audibly-impaired user to input individual characters of the user-selected text string;
transmitting the user-selected text string as non-tone-based real-time text (RTT) data to the another video endpoint during the ongoing video communication session for display by the another video endpoint including:
transmitting text data corresponding to the user-selected text string separate from the video data to the another video endpoint if it is determined that the another video endpoint is capable of receiving text data; and
transmitting video data with text corresponding to the user-selected text string embedded into the video data to the another video endpoint if it is determined that the another video endpoint is not capable of receiving text data;
modifying the database of text strings responsive to another user input from the audibly-impaired user; and
determining whether the another video endpoint is capable of receiving text data transmitted from the video endpoint.

12. The method of claim 11, further comprising:
selecting another text string from the displayed text strings responsive to another user input from the audibly-impaired user during the ongoing video communication session;
displaying the another selected text string into a text editing field of the graphical user interface prior to transmitting the another selected text string during the ongoing video communication session;
modifying the another selected text string displayed in the text editing field prior to being transmitted to the another video endpoint during the ongoing video communication session; and
transmitting the modified another selected text string to the another video endpoint to enable the another video endpoint to display the modified another text string during the ongoing video communication session.

13. A method of operating a video endpoint for audibly-impaired users, the method comprising:
engaging in an ongoing video communication session with another video endpoint,
displaying text strings stored in a database in a graphical user interface of the video endpoint during the ongoing video communication session;
selecting a text string from the displayed text strings responsive to a user input from the audibly-impaired user during the ongoing video communication session without requiring the audibly-impaired user to input individual characters of the user-selected text string;
transmitting the user-selected text string as non-tone-based real-time text (RTT) data to the another video endpoint during the ongoing video communication session for display by the another video endpoint;
modifying the database of text strings responsive to another user input from the audibly-impaired user;
receiving data corresponding to text from the another video endpoint during the ongoing video communication session;
displaying the text corresponding to the data received from the another video endpoint during the ongoing video communication session; and
storing the text received from the another video endpoint as a new text string to the database that is subsequently available for selection by the audibly-impaired user during the ongoing video communication session.

14. A method of transforming a computing device into a video endpoint, the method comprising:
storing computer-readable instructions on one or more storage devices of one or more servers configured to communicate with the computing device, the computer-readable instructions configured to instruct the computing device to:
establish a video communication session with another video endpoint; and
generate and display a user interface to an audibly-impaired user, the user interface configured to:
manage a database of text strings stored in a database at least by adding new text strings, updating existing text strings, or deleting existing text strings responsive to a user input from the audibly-impaired user, wherein the database is shared database such that changes made to the text strings stored in the database are available to other video communication devices that are operated by the same audibly-impaired user; and
enable the audibly-impaired user to select from the text strings stored in the database during the ongoing video communication session without requiring the audibly-impaired user to input individual characters of the selected text string; and
transmit the user-selected text string during the ongoing the video communication session in a non-tone-based real-time text (RTT) format to the another video endpoint for presentation to the other user.

15. A video endpoint, comprising:
video equipment configured to enable an audibly-impaired user of the video endpoint to engage in a two-way video communication session with a translator at a video relay service configured to translate between the video data from the audibly-impaired user and audible data from an audio endpoint during a simultaneous audio communication session between the video relay service and the audio endpoint;
at least one storage device configured to store a database of text strings; and
at least one control circuit configured to:
display a graphical user interface to the audibly-impaired user on an electronic display, the graphical user interface comprising:
a video field configured to display video of the translator received from the video relay service during an ongoing video communication session with the relay service;
a list of at least a portion of the text stings stored in the database in a user-selectable arrangement, the list configured to enable the audibly-impaired user to select from the text strings stored in the database during the ongoing video communication session without requiring the audibly-impaired user to input individual characters of the selected text string;
a text editing field configured to enable the audibly-impaired user to input, update, or delete text strings in the database to modify the text strings that are available for selection by the audibly-impaired user, wherein the database is shared database such that changes made to the text strings stored in the database are updated to databases in other video communication devices that are operated by the same audibly-impaired user; and
transmit, in a non-tone-based real-time text (RTT) format, the user-selected text string during the ongoing video communication session to the video relay service for presentation to the translator.

16. The video endpoint of claim 15, wherein the text strings include one or more account numbers, mailing addresses, email addresses, telephone numbers, prescription information, payment information, driving instructions, restaurant orders, a work address, or a residential address of the audibly-impaired user of the video endpoint.

17. The video endpoint of claim 15, further comprising a remote control configured to control the video endpoint to select the user-selected text string during the ongoing video communication session responsive to an input from the audibly-impaired user into the remote control.

18. A communication system configured to facilitate communication between an audibly-impaired user and an audibly-capable user through a video relay service, the communication system comprising:
a video relay service configured to provide sign language translation services by establishing video communication between a translator and the audibly-impaired user, and audio communication between the translator and the audibly-capable user; and
a plurality of video communication devices specifically configured for use by the audibly-impaired user, each video communication device having a camera, electronic display, and control circuit configured to:
retrieve text strings during an ongoing video communication session from a database of pre-stored text strings;
display the retrieved text strings during the ongoing video communication session to the electronic display of the video communication device;
receive an input from the audibly-impaired user selecting one of the displayed text strings during the ongoing video communication session;
transmit the selected text string to the translator at the video relay service during the ongoing video communication session; and
add new text strings, delete the text strings, or update the text strings in the database to modify the text strings stored in the database subsequently available for selection during the ongoing video communication session or another video communication session;
wherein each video communication device is further configured to access a shared database including the database such that changes made to the text strings stored in the database on one video communication device are available to the other video communication devices that are operated by the same audibly-impaired user.

* * * * *